(12) United States Patent
Faller et al.

(10) Patent No.: US 10,865,854 B2
(45) Date of Patent: Dec. 15, 2020

(54) TRANSMISSION

(71) Applicants: Alexander Michael Faller, Rottenburg a. d. Laaber (DE); Johanna Maria Faller, Rottenburg a. d. Laaber (DE)

(72) Inventors: Alexander Michael Faller, Rottenburg a. d. Laaber (DE); Johanna Maria Faller, Rottenburg a. d. Laaber (DE)

( * ) Notice: Subject to any disclaimer, the term of this patent is extended or adjusted under 35 U.S.C. 154(b) by 763 days.

(21) Appl. No.: 15/622,845

(22) Filed: Jun. 14, 2017

(65) Prior Publication Data
US 2017/0363177 A1 Dec. 21, 2017

(30) Foreign Application Priority Data

Jun. 15, 2016 (DE) .................. 10 2016 110 975

(51) Int. Cl.
*F16H 3/097* (2006.01)
*F16H 3/08* (2006.01)
*F16H 3/093* (2006.01)

(52) U.S. Cl.
CPC ..... *F16H 3/097* (2013.01); *F16H 2003/0803* (2013.01); *F16H 2003/0933* (2013.01); *F16H 2200/0078* (2013.01)

(58) Field of Classification Search
CPC ............. F16H 3/097; F16H 2003/0803; F16H 2003/0933
USPC ................................... 74/330, 331
See application file for complete search history.

(56) References Cited

U.S. PATENT DOCUMENTS

| 5,365,800 | A | 11/1994 | Müller | |
|---|---|---|---|---|
| 7,866,232 | B2 * | 1/2011 | Gitt | F16H 37/043 74/329 |
| 8,789,433 | B2 * | 7/2014 | Jerwick | F16H 3/091 74/329 |
| 8,997,595 | B2 * | 4/2015 | Sasada | F16H 3/093 74/331 |
| 9,003,905 | B1 * | 4/2015 | Lee | F16H 3/093 74/330 |
| 9,032,825 | B2 * | 5/2015 | Okubo | B60K 6/48 74/330 |

(Continued)

FOREIGN PATENT DOCUMENTS

EP 0 557 707 A1 9/1993
EP 2 379 402 A1 10/2011

*Primary Examiner* — Ha Dinh Ho
(74) *Attorney, Agent, or Firm* — HoustonHogle LLP

(57) ABSTRACT

This application discloses a transmission having a plurality of transmission sections, wherein each transmission section comprises:
a driven primary shaft (1);
at least one secondary shaft (13), which is arranged to rotate independently, in particular axis-parallel, with respect to the primary shaft (1); and
a clutch arrangement (4, 5), which is formed to selectively couple the primary shaft (1) directly with a driven shaft or to couple the secondary shaft (13) or one of the secondary shafts between the primary shaft (1) and the driven shaft, wherein the driven shaft is a primary shaft (1) of a further transmission section or an output shaft of the transmission, wherein the coupled secondary shaft (13) comprises a predetermined transmission ratio with respect to the primary shaft (1), wherein when multiple secondary shafts are provided, respective coupled secondary shafts comprise different transmission ratios with respect to the primary shaft (1).

17 Claims, 25 Drawing Sheets

(56) References Cited

U.S. PATENT DOCUMENTS

2009/0095101 A1* 4/2009 Gitt ................... F16H 37/042
                                                                                        74/331

2011/0251008 A1   10/2011  Schmitz et al.

* cited by examiner

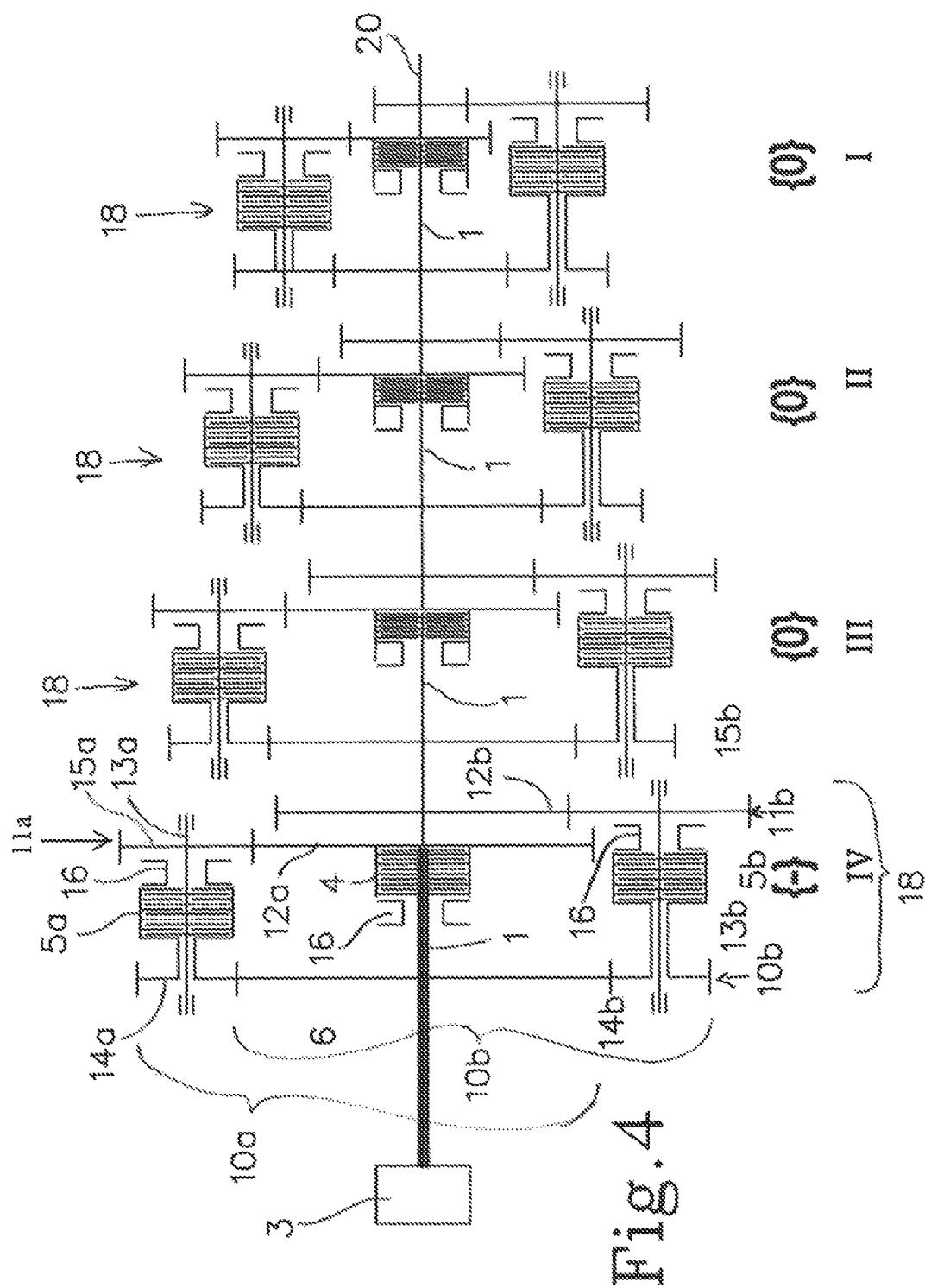

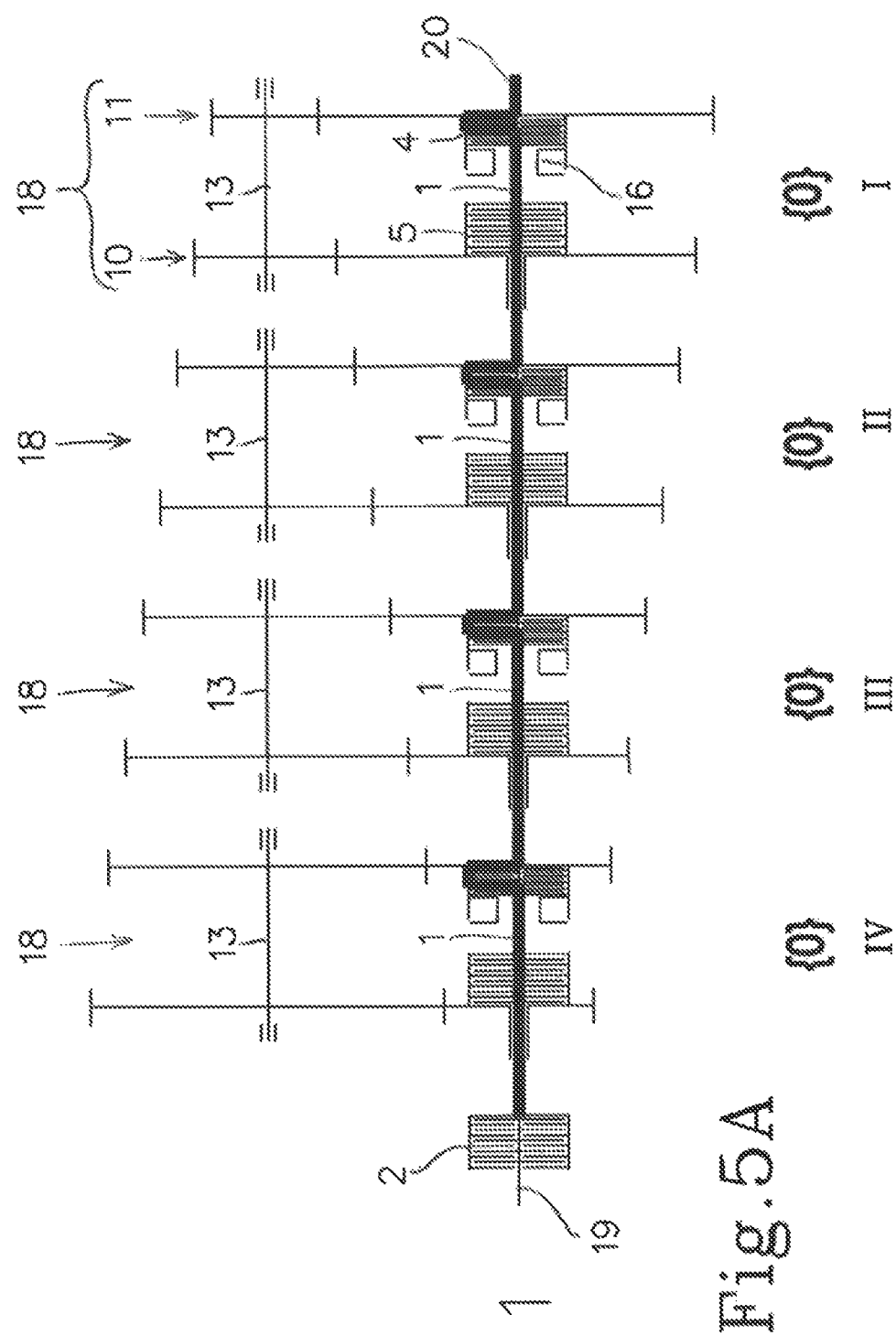

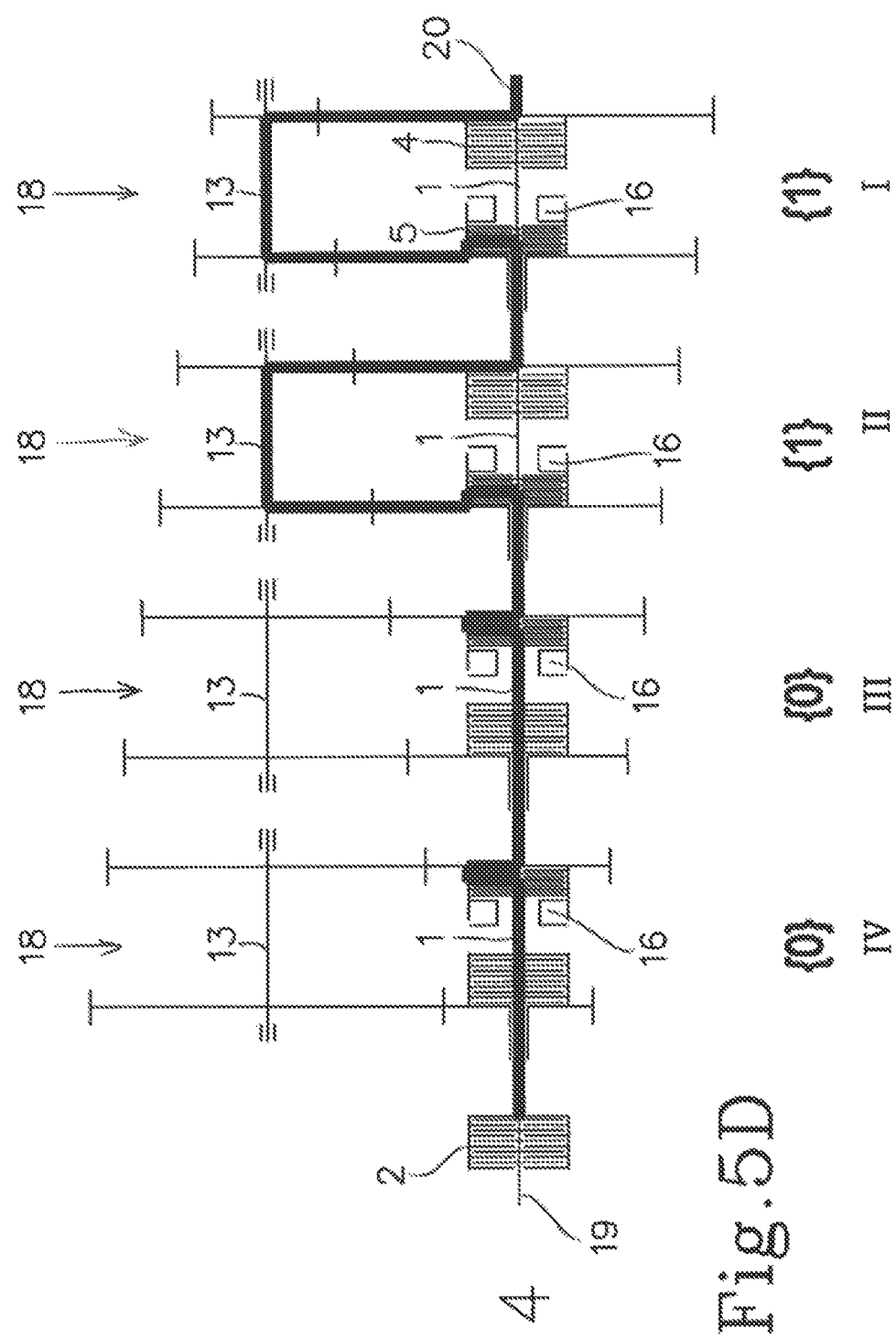

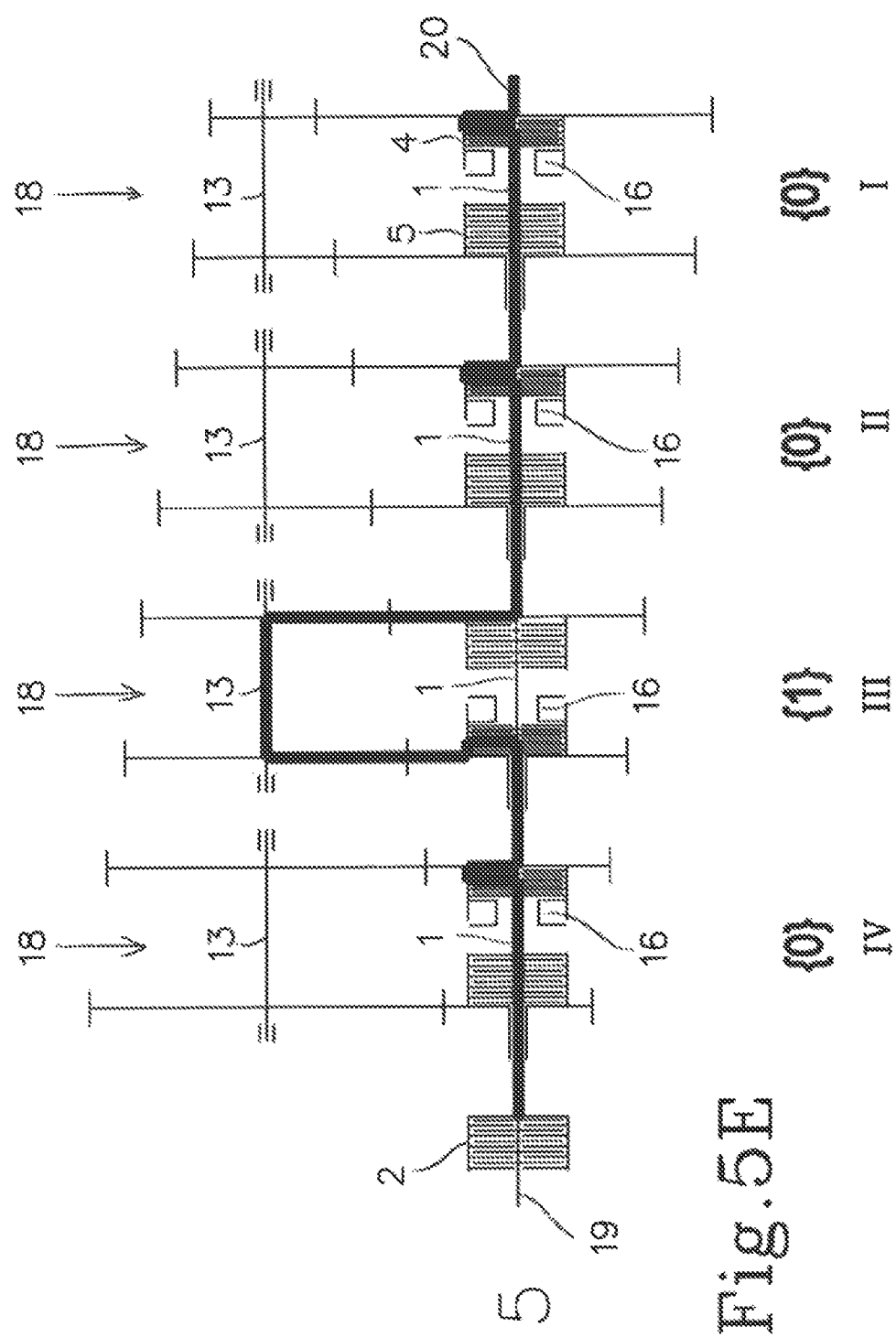

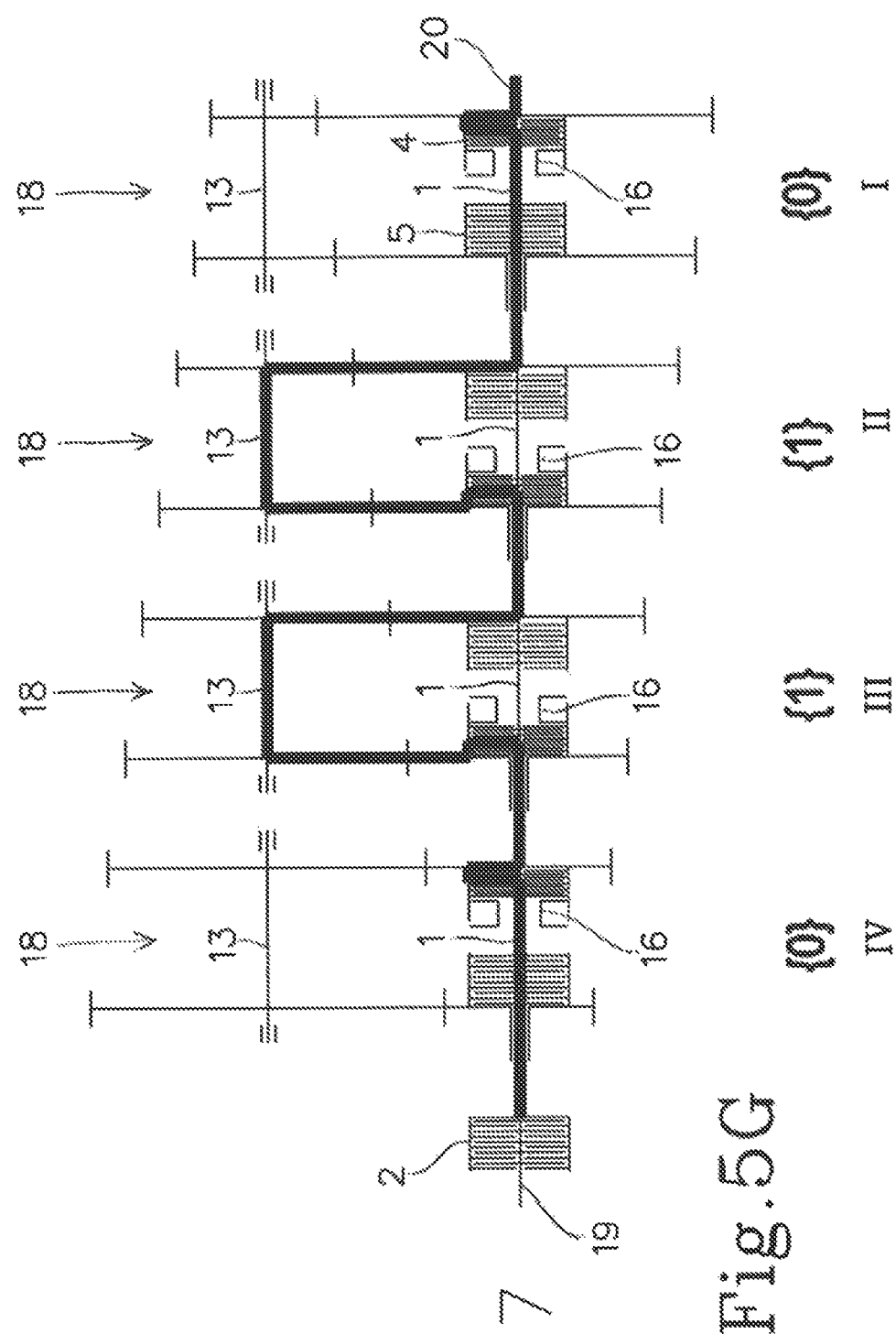

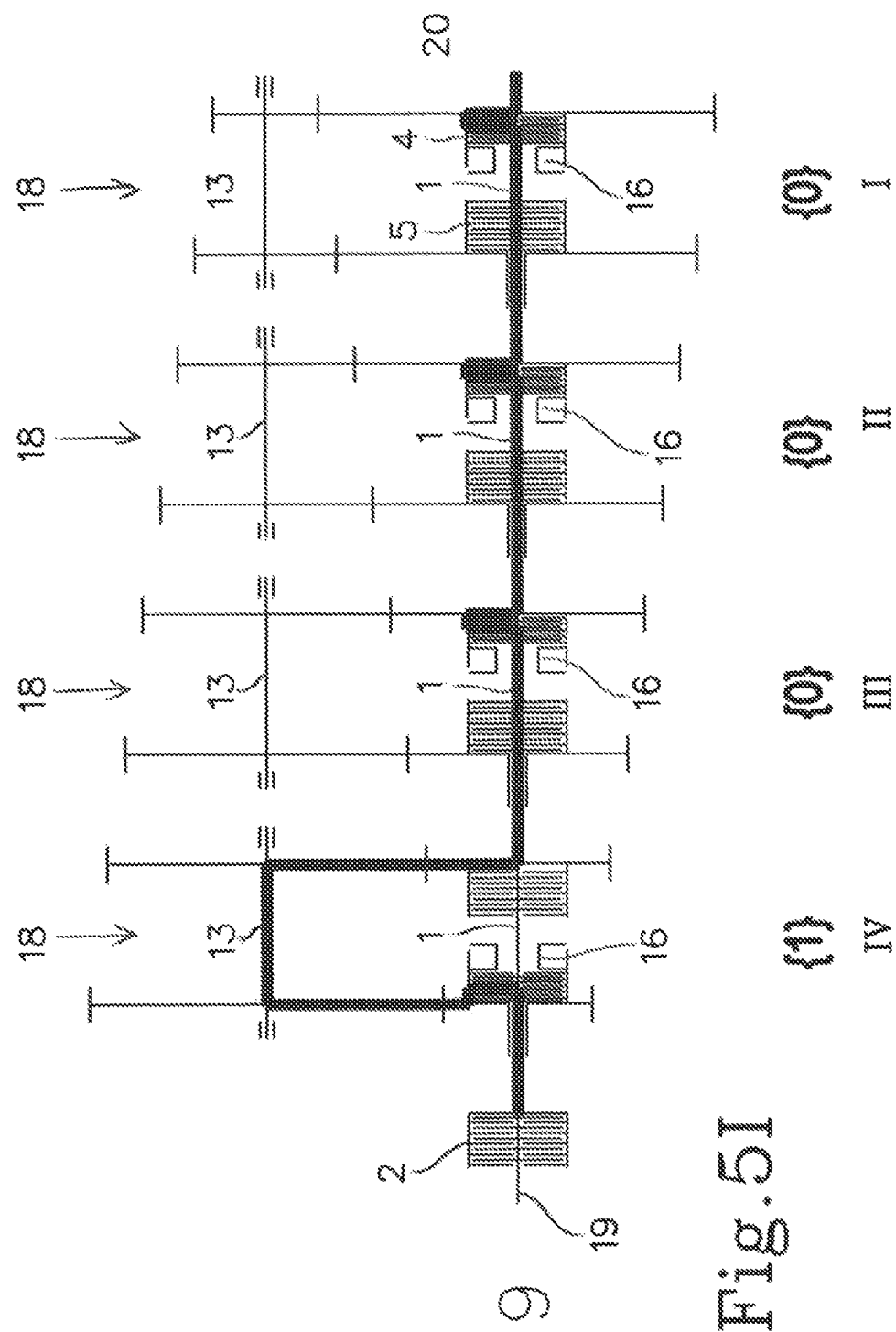

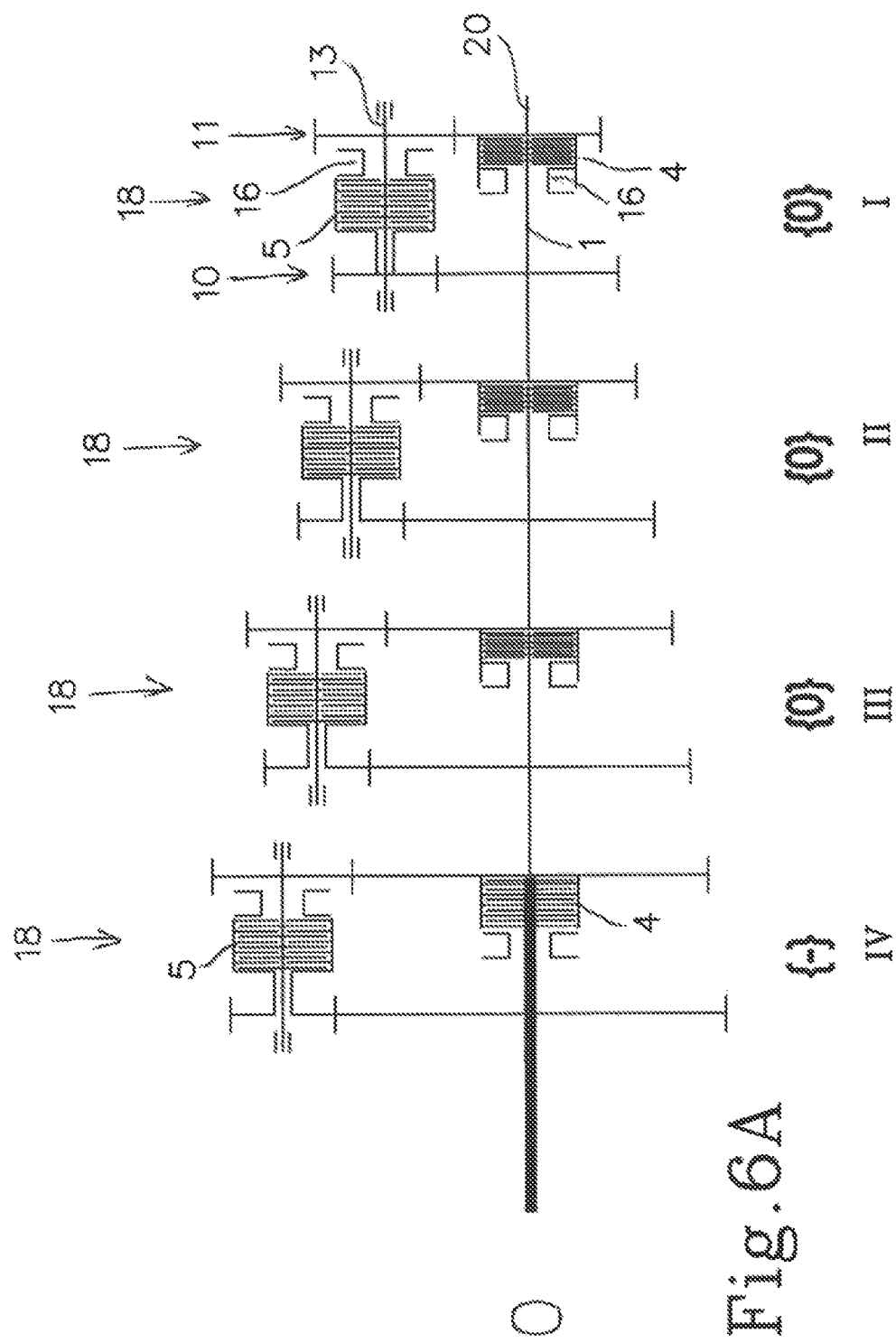

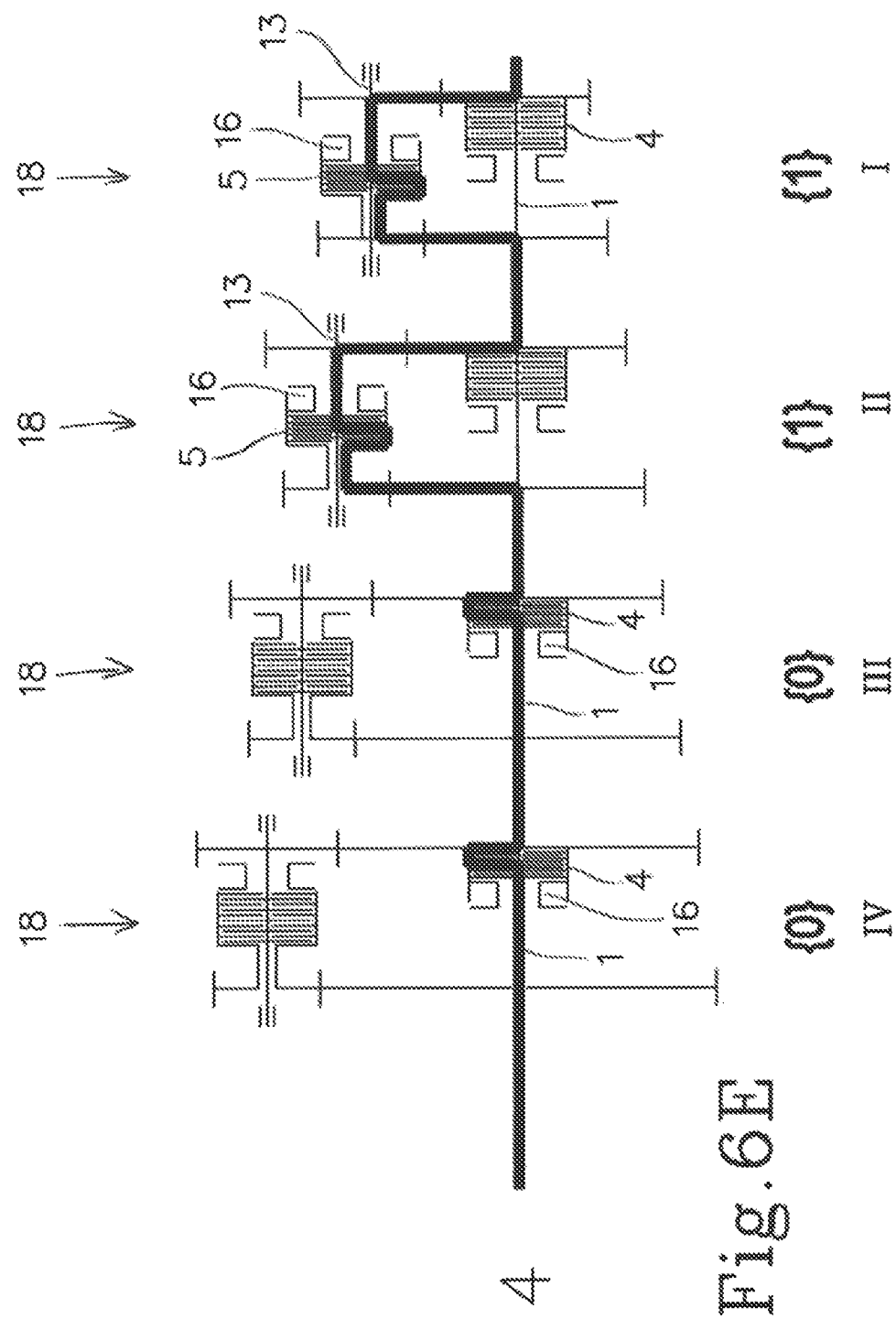

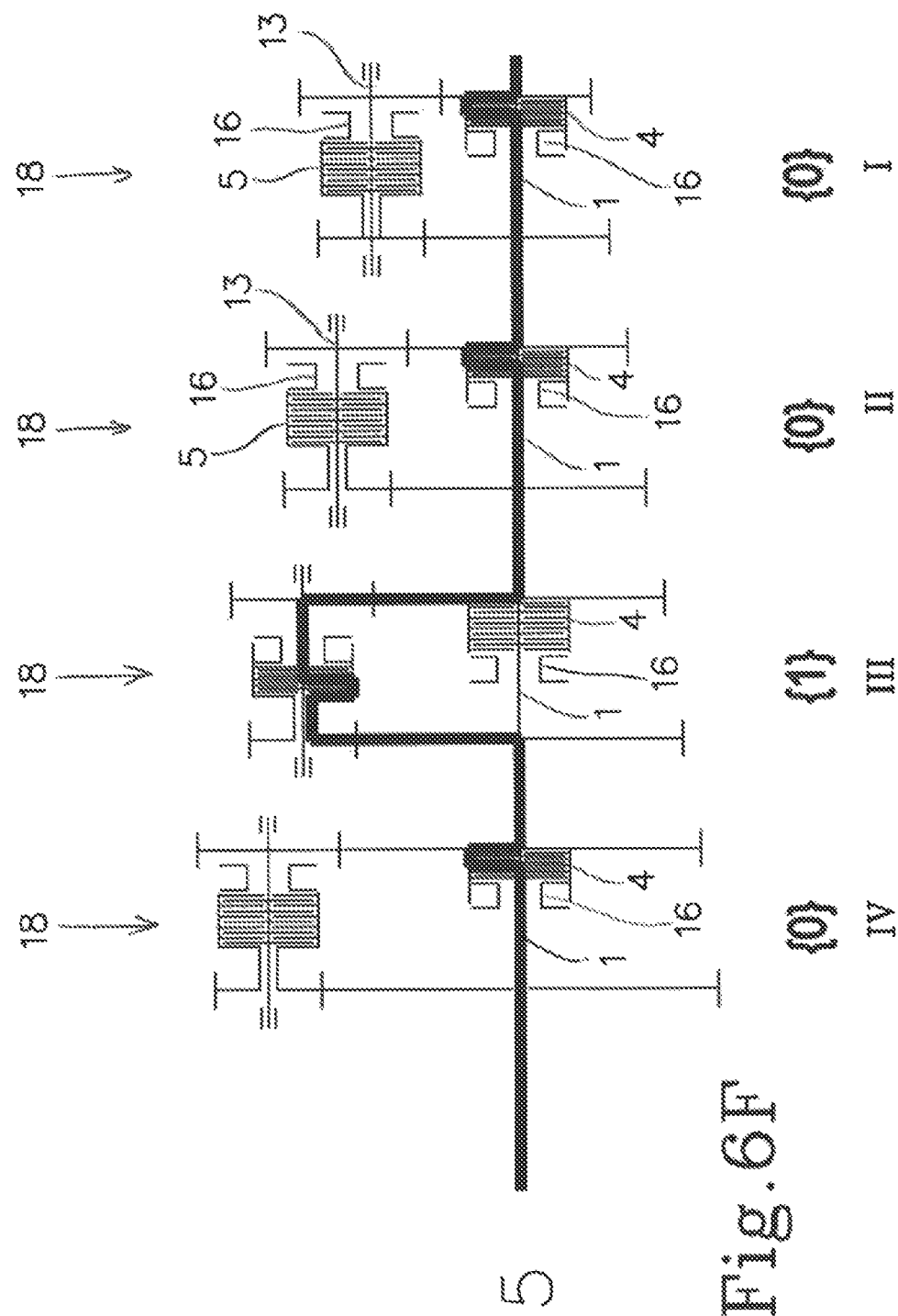

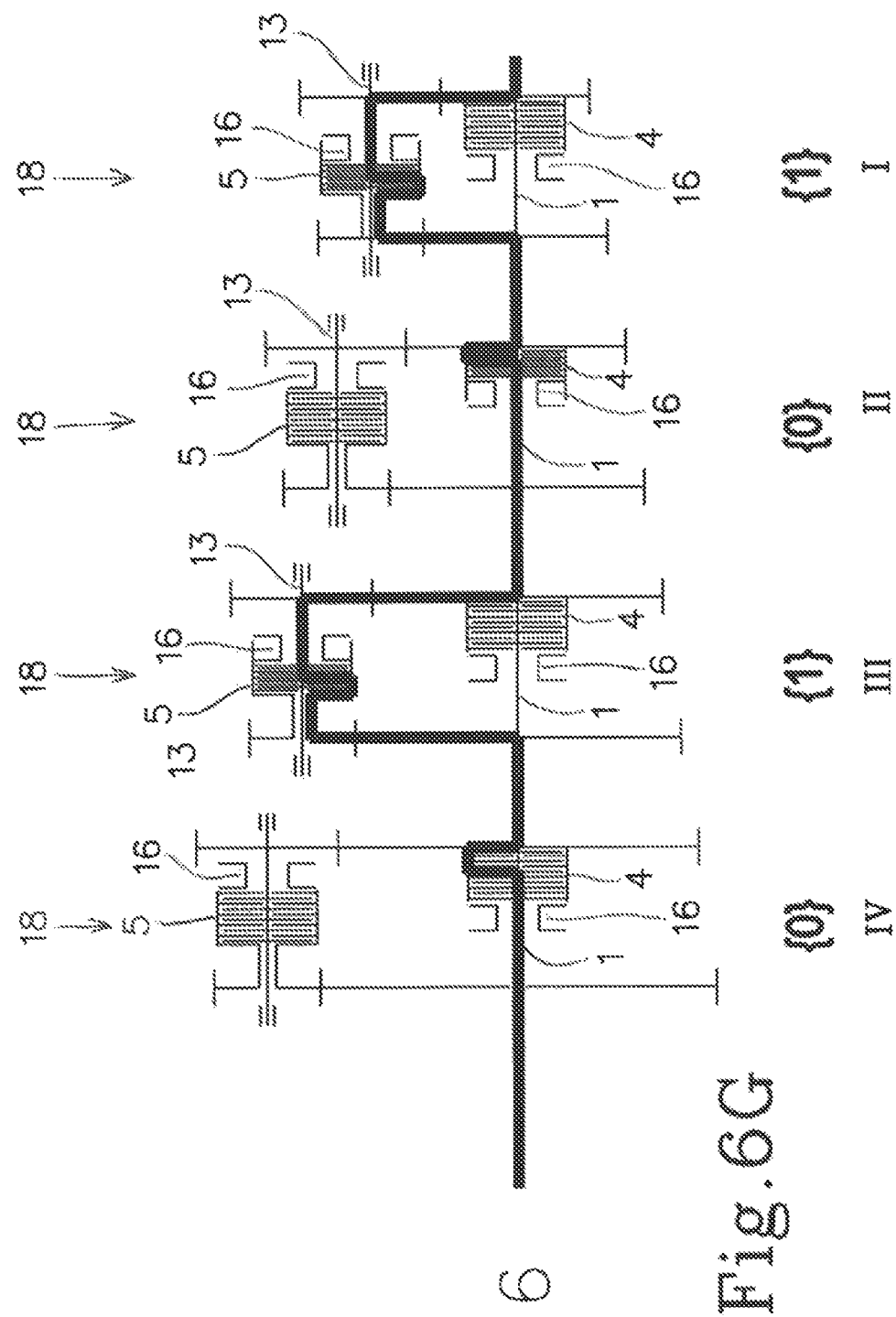

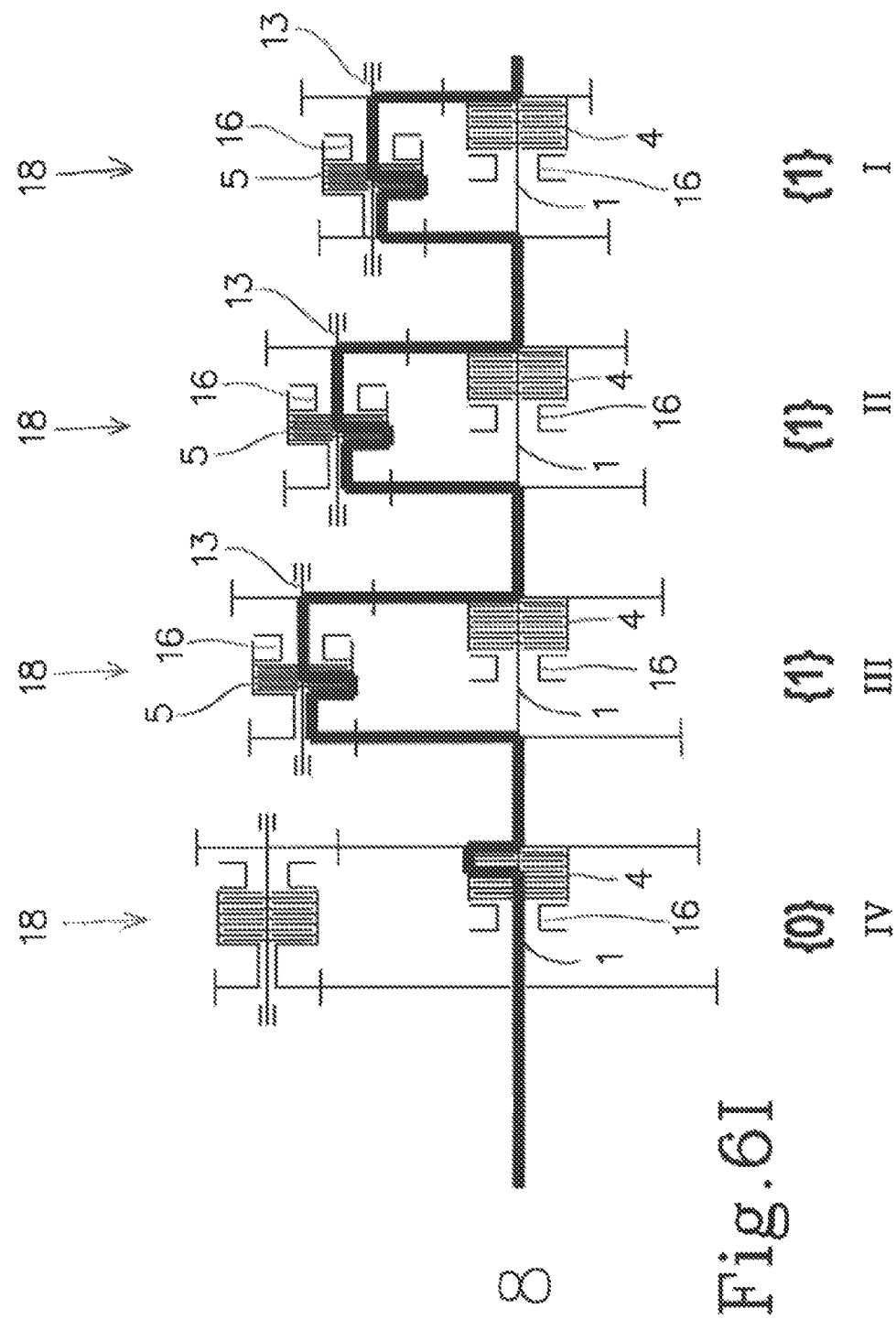

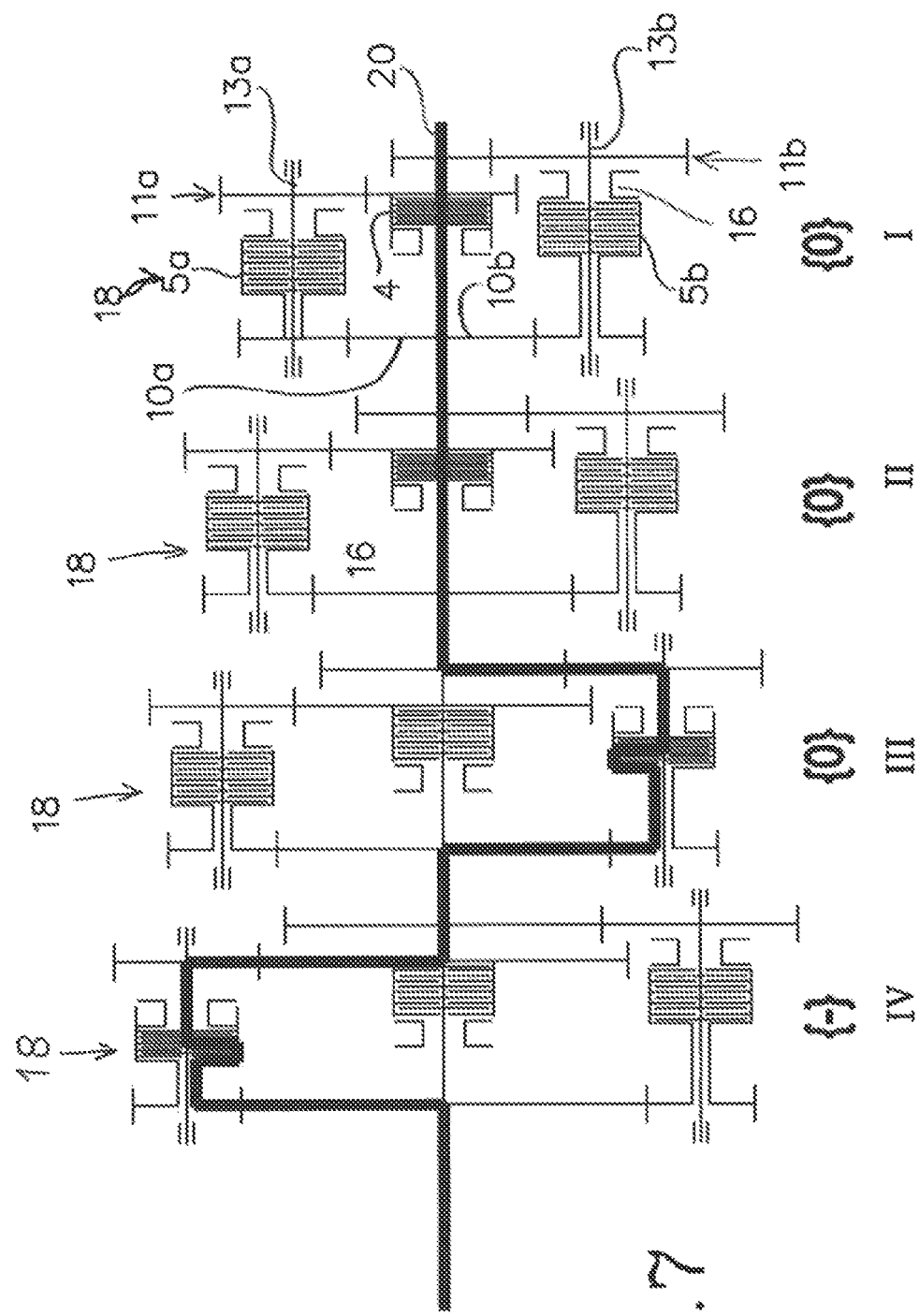

TRANSMISSION

RELATED APPLICATIONS

This application claims priority under 35 U.S.C. § 119 to German Patent Application No. 10 2016 110 975.4, filed Jun. 15, 2016, which is incorporated herein by reference in its entirety.

BACKGROUND OF THE INVENTION

In particular in motor vehicles, it is important in transmissions to operate the vehicle, as possible, in the optimal speed range of the drive (engine) in each gear, in order to achieve the best torque along with highest power and the lowest energy or fuel consumption. In order to achieve this, transmissions having many gears (8 and more) have been developed. For preventing longer interruptions in the force closure, so-called double clutches are used, which permit shifting into a preselected lower or higher gear by releasing the clutch of a gear while the clutch of the next higher or lower gear is closed. The remaining gear wheel pairs, which are located on the same shafts as the shifted gears, need to be separated most of the time. The structure of these transmissions is often very complicated since planetary gears are used, for example, which are shifted by alternately fixing planetary carriers, sun gear or ring gear, and the rotary movement has to be re-transferred into the drive train.

In bicycle transmissions (and more general in vehicles driven by muscular strength), so-called derailer gearings usually having up to three sprockets on the bottom bracket, and multiple pinions on the rear wheel hub form a commonly accepted standard. Furthermore, EP 2,379,402 A1 discloses the so-called pinion bottom bracket transmission. In the pinion transmission, an input shaft can be connected with cranks on opposite sides. A first partial transmission comprises a countershaft, wherein a plurality of drive gear wheels is mounted on the input shaft, and wherein a corresponding plurality of driven gear wheels of the first partial transmission is mounted on the countershaft, wherein the driven gear wheels of the first partial transmission are formed as loose wheels, which can be connected rotationally fixed to the countershaft by means of shifting means. The countershaft forms an input shaft of a second partial transmission, on which a plurality of second drive wheels is mounted. The second partial transmission comprises an output shaft, on which a corresponding plurality of second driven gear wheels is mounted, wherein the second drive wheels of the second partial transmission are formed as loose wheels, which can be connected rotationally fixed to the input shaft by means of shifting means, and wherein the output shaft of the second partial transmission is formed as a hollow shaft, which is arranged coaxially to the input shaft. Both in the derailer gearing and in the pinion bottom transmission, separate shifting means for the transmission parts (bottom bracket/pinion or first/second partial transmission) are provided, wherein, for the realization of a continuous gear sequence, one transmission part must be shifted back when the other transmission part is shifted up by one stage. There may also be overlaps on the gear sequence, i.e. a certain region of the overall transmission can be produced by multiple combinations of shifting positions of the transmission parts.

EP 0 557 707 B1 describes a transmission, comprising an input shaft having a first loose wheel mounted thereon, an output shaft arranged coaxially with the input shaft and mounted on one side in a hollow end of the same, a second loose wheel mounted thereon and further three loose wheels, and an auxiliary shaft having five fixed wheels arranged parallel to the input shaft and the output shaft, the fixed wheels each forming a gear wheel pair or a gear set together with the respective loose wheel by combing with the respective loose wheel directly or indirectly by means of an intermediate wheel for inversion of the direction. A synchronization clutch allows selectively coupling the first loose wheel or the second loose wheel with the input shaft, and thus the auxiliary shaft can be carried along by the first fixed wheel, which combs with the first loose wheel, or by the second fixed wheel, which combs with the second loose wheel. The second loose wheel or the third loose wheel can selectively be coupled by means of a second synchronization clutch. In the first case, the output shaft is connected to the output shaft directly via the first clutch, the second loose wheel and the second clutch. In the second case, the power flux is effected from the input shaft via the first clutch, the second loose wheel and the second fixed wheel to the auxiliary shaft and from there to the output shaft via the third fixed wheel, which combs with the third loose wheel and the second clutch. Further gears can be realized in each of the clutch positions of the first clutch in that the second clutch is brought into a neutral position, in which the second and the third loose wheel are free, and a third clutch selectively couples the fourth or fifth loose wheel with the output shaft. In this way, six forward gears and one reverse can be realized with this transmission. If further gears are realized in this transmission, this can be effected by adding in each case two further gear wheel pairs and a further clutch, wherein according to the teachings of the invention only two clutches of one of the loose wheels assigned to it, while the other clutches are in a neutral position. In this way, four additional gears can be obtained per additional clutch with associated two gear wheel pairs. Very large gear numbers would require excessive clutches and gear wheels, which means a high mechanical effort.

SUMMARY OF THE INVENTION

The present invention relates to a transmission, in particular, a discretely variable transmission.

The object of the invention is to provide a transmission which enables a high number of gears by a simple shift-logical structure at little mechanical effort. Moreover, it is to be possible to keep the changes in the speed between the individual gears as constant as possible in this transmission, in order to have the drive always working in an optimum speed range which is as narrow as possible. Furthermore, a continuous gear sequence is to be enabled by one single actuation.

At least in partial aspects, the object is achieved by a transmission having the features of the independent claim 1. Preferred embodiments and advantageous developments are the subject-matter of the sub-claims.

The idea underlying the invention is to provide a transmission, which, in terms of its operation, corresponds to the logics of a numeral system. First, the inventors considered a dual numeral system, wherein a transmission comprises multiple transmission sections each having two shift positions having different transmission ratio, wherein the drive side of a transmission section leads into the drive side of a next transmissions section (provided a next transmission section is present, alternatively the drive side corresponds to the transmission section of the drive side of the entire transmission). Accordingly, such a transmission with n transmission sections may comprise a total number of ($2^n$)

transmission section (gears). In accordance with the binary structure having two shift positions per transmission section, such a transmission can also be referred to as a binary transmission, wherein each transmissions section corresponds to one digit of a dual (binary) numeral system. In further considerations, it was found that each transmission section may comprise more than two shift positions. When each transmission section comprises m+1 shift positions (e.g. a direct connection position having a transmission ratio=1 and m further shift positions having a fixed transmission ratio 1), such a transmission having n transmission sections may comprise a total number of $(m+1)^n$ gears. Since the number of gears increases exponentially along with the number of the transmission sections, with the number of the possible shift positions per transmission section forming the base or base number of the exponential function, such a transmission can also be referred to as an "exponential transmission". Here, the individual gears can be shifted by a reduction or transmission system, with each gear stage corresponding to a number of the used numeral system. Obviously, the construction of a real transmission is not limited to transmission sections with an identical number of shift positions, but the transmission sections may comprise a different number of shift positions.

In the constructional implementation of such a transmission, two shift positions of a transmission section of a binary transmission can be realized by a main or primary shaft and a bypass, auxiliary or secondary shaft, which has a fixed transmission ratio with respect to the primary shaft, wherein the secondary shaft can selectively be coupled in the force-fit instead of the primary shaft by the clutches. More than two shift positions per transmission section can be realized by correspondingly more secondary shafts, which can alternatively be coupled and/or be coupled as a cascade.

Based on these considerations, according to the present invention pursuant to claim 1, a transmission having a plurality of transmission sections is proposed, wherein each transmission section comprises: a driven primary shaft; at least one secondary shaft, which is arranged to rotate independently, in particular axis-parallel, with respect to the primary shaft; and a clutch arrangement, which is formed to selectively couple the primary shaft directly with a driven shaft or to couple the secondary shaft or one of the secondary shafts between the primary shaft and the driven shaft, wherein the driven shaft is a primary shaft of a further transmission section or an output shaft of the transmission, wherein the coupled secondary shaft comprises a predetermined transmission ratio with respect to the primary shaft, wherein, when multiple secondary shafts are provided, respective coupled secondary shafts comprise different transmission ratios with respect to the primary shaft.

As used in the present invention, a driven primary shaft is a shaft which is formed to receive an external drive torque, i.e. a drive torque provided from outside the transmission section. Here, the external drive torque can be provided by an upstream transmission section or by a drive unit located outside the transmission, which may have a motoric, or other type of design. In the sense of the invention, a transmission ratio can be a transmission ratio or a reduction ratio. In the sense of the present invention, a coupling is the production of a connection, by means which a torque can be transmitted. In the sense of the invention, an output shaft of the transmission is a shaft which is formed to output the drive torque of the transmission to the outside or to make this torque receivable from the outside.

Since the rotation of the primary shaft is selectively transmitted directly or with a predetermined transmission ratio to the following primary shaft via the secondary shaft due to the clutch arrangement, a transmission having the above described effects can be realized by multiple transmission sections connected in series. Even if only one secondary shaft is provided in a transmission section, the number of possible gears doubles with each further transmission section. When more than one secondary shaft is provided in a transmission section, the number of shift positions can be further increased in a transmission section, which in turn rises the number of gears in a series connection of multiple transmission sections.

In a development according to claim 2, at least one of the transmission sections comprises at least one secondary shaft of higher order, which is arranged to rotate independently, in particular axis-parallel with respect to the secondary shaft or one of the secondary shafts, and the clutch arrangement is formed to selectively directly couple the secondary shaft with the driven shaft or to couple the secondary shaft of higher order between the secondary shaft and the drive shaft, wherein the coupled secondary shaft of higher order has a predetermined transmission ratio with respect to the secondary shaft. As a result, the number of shift positions can be further increased.

When, in an embodiment according to claim 3, primary shafts of multiple, in particular all of the transmission sections are arranged coaxially to one another and/or secondary shafts of multiple, in particular all, of the transmission sections are arranged coaxially to one another, the mounting of the shafts and the production of a housing can be facilitated. When, in a further development according to claim 4, coaxially arranged primary shafts and/or coaxially arranged secondary shafts are hollow shafts, which are preferably supported by a support shaft, the mass or at least the moment of inertia of the hollow-design shafts can be reduced. Now, there is also the option to actuate shifting or the clutches by the hollow shafts.

When, in an embodiment according to claim 5, an initial position of each transmission section is a shift position, in which the primary shaft is directly coupled with the driven shaft, the direct drive can be set as reference transmission (1:1).

When, in an embodiment according to claim 6, at least one of the transmission sections comprises an idle position, in which none of the primary shaft and the secondary shaft(s) is coupled with the driven shaft, a drive engine can be permanently coupled with the transmission, for example, without a further input clutch being required. In other words, a separation of the force-fit between the drive engine and a consumer (e.g. the wheels of a vehicle) can be realized by the transmission per se.

In an advantageous embodiment according to claim 7, each transmission section comprises a first gear set, which is arranged between a drive side of the primary shaft and a drive side of the secondary shaft; and a second gear set, which arranged between a drive side of the secondary shaft and a drive side of the driven shaft, wherein one of the first gear set and the second gear set comprises a loose element, and wherein the clutch arrangement is formed in such a way as to couple the loose element. In the sense of the invention, a gear set is any arrangement, which is capable of transmitting a torque from one shaft to another shaft. In a simple case, a gear set may comprise two wear wheels, for example, which are arranged on one or the other shaft, and one of the gear wheels of the first or the second gear set can be a loose wheel, which is loosely arranged on the primary shaft, the secondary shaft or the driven shaft, and which can be co-rotationally coupled to the respective shaft on which it is located, by the clutch arrangement.

In a development according to claim 8, in each case the first gear set or the second gear set of multiple secondary shafts of a transmission section may share a transmission element, so that component, space requirements, mass and mounting efforts are saved.

In a preferred embodiment according to claim 9, the first gear set comprises a first gear wheel, which is arranged on the primary shaft, and a second gear wheel, which is arranged on the secondary shaft, as transmission elements; the second gear set comprises a third gear wheel, which is arranged on the secondary shaft, and a fourth gear wheel, which is arranged on the driven shaft, as transmission elements. Incidentally, at least one of the first gear wheel, the second gear wheel, the third gear wheel and the fourth gear wheel can be the loose element, wherein the clutch arrangement is formed

- to couple the first gear wheel with the primary shaft if the first gear wheel is the loose element,
- to couple the second gear wheel or the third gear wheel with the secondary shaft if the second gear wheel or the third gear wheel is the loose wheel,
- to couple the fourth gear wheel with the driven shaft, if the fourth gear wheel is the loose wheel.

Incidentally, the first gear wheel, the second gear wheel, the third gear wheel and the fourth gear wheel can be gear wheels, wherein preferably the first gear wheel is engaged with the second gear wheel, and the third gear wheel is engaged with the fourth gear wheel. In modifications, the gear sets may have another structure, e.g. having friction gears, belts or chains, and may also comprise one or multiple intermediate elements beyond the wheels arranged on a shaft pair.

In an embodiment according to claim 10, the clutch arrangement comprises a primary clutch and secondary clutch, wherein an input side of the primary clutch is connected to the primary shaft and an output side of the primary clutch is connected to the driven shaft.

In an embodiment according to claim 11,

- an input side of the secondary clutch is connected to the primary shaft, wherein the first gear wheel is the loose element, which is loosely arranged on the primary shaft and connected to the output side of the secondary clutch, or
- an output side of the secondary clutch is connected to the secondary shaft, wherein the second gear wheel is the loose element, which is loosely arranged on the secondary shaft and connected to the input side of the secondary clutch, or
- an input side of the secondary clutch is connected to the secondary shaft, wherein the third gear wheel is the loose element, which is loosely arranged on the secondary shaft and connected to the output side of the secondary shaft, or
- an output side of the secondary clutch is connected to the driven shaft, wherein the fourth gear wheel is the loose element, which is loosely arranged on the driven shaft and connected to the input side of the secondary clutch.

In a further development according to claim 12, the primary clutch and the secondary clutch can preferably be shifted by a common shifting element.

In a development according to claim 13, the shifting device is formed to shift the gears of the transmission in continuously upward or downward stages of an overall transmission ratio of all transmission sections of the transmission.

In a development according to claim 14, the transmission is suitable for use on a heat machine, power machine or work machine or a mechanic engine, such as a
- tooling machine,
- a generator, in particular a power station such as a hydropower station, a steam power station or a wind power station, or
- a turbine, in particular of a power station such as a hydropower station, a steam power station or a wind power station or a vehicle such as a ship, or
- an engine, in particular of a motor vehicle such as an automobile, a motor truck or a motorcycle or a watercraft, or
- a crank drive of a vehicle driven by muscular strength, in particular of a bicycle.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

Further features, objects and effects of the present invention will become apparent from the following description of specific exemplary embodiments. For illustrating the exemplary embodiment, reference is made to the attached drawing. The drawings show in:

FIG. 4 a schematic illustration of a transmission according to yet another exemplary embodiment of the present invention;

FIGS. 5A through 5I different shift positions of a transmission according to yet another exemplary embodiment of the present invention;

FIGS. 6A through 6J schematic illustrations of a transmission of yet another exemplary embodiment in different shift positions;

FIG. 7 a selected shift position of the transmission of FIG. 4; and

DETAILED DESCRIPTION OF THE PREFERRED EMBODIMENTS

The present invention will now be explained in detail by means of preferred embodiments with reference to the attached drawings, in which illustrative embodiments of the invention are shown. It goes without saying that the figurative illustrations are only schematic and not necessarily made to scale. This invention may be embodied in many different forms and should not be construed as limited to the embodiments set forth herein; rather, these embodiments are provided so that this disclosure will be thorough and complete, and will fully convey the scope of the invention to those skilled in the art. It is also understood that the drawings and the following description focus on the features helpful in understanding the invention, without limiting the scope of the present invention, which is defined by the attached claims in the broadest sense.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
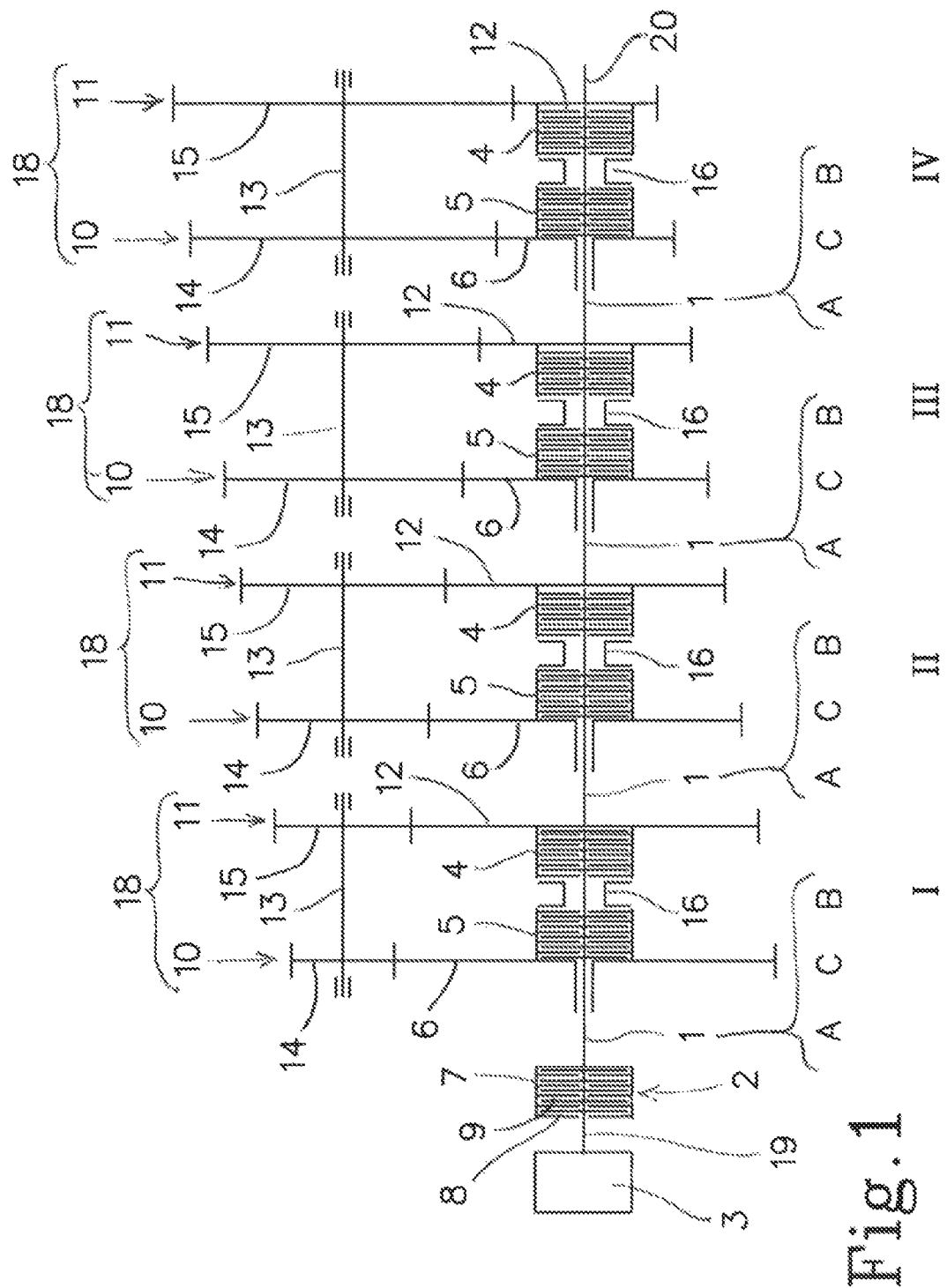
FIG. 1 a schematic illustration of a transmission according to an exemplary embodiment of the present invention.

Mechanical Structure:

FIG. 1 is a schematic illustration of a transmission according to an exemplary embodiment of the present invention.

The transmission of this exemplary embodiment comprises four transmission sections 18 and one output shaft 20. The transmission sections 18 are numbered from I to IV. Each transmission section 18 comprises a primary shaft 1, a secondary shaft 13, a first gear set 10 having a first gear wheel 6 and a second gear wheel 14, a second gear set 11 having a third gear wheel 15 and a fourth gear wheel 12, a primary clutch 4, a secondary clutch 5 and a pressure ring 16. In each transmission section 18, a drive side A, a driven side B and an intermediate position C are discriminated. In this embodiment, in each case the first gear wheel 6 is loosely mounted on the primary shaft 1 (loose wheel), the second gear wheel 14 and the third gear wheel 15 are co-rotationally connected to the secondary shaft 13, the fourth gear wheel 12 is co-rotationally connected to the drive side A of the primary shaft 1 of the following transmission section 18 or for the last transmission section 18 with the end output shaft 20. A drive unit 3, a driven shaft 19 and an input clutch 2 are provided on the drive side A of the first of the transmission sections 18. The drive unit 3 can be an internal combustion engine, an electric motor, a hydraulic drive or a mechanic drive such as a turbine or a crank drive; the invention is not limited to this. The driven shaft 19 can also be referred to as driven shaft of the drive unit 3.

The pressure ring 16 is to be understood as an example of an actuator for actuating the clutch, but any other actuation element (e.g. piezo-ceramics; electric coil; hydraulic element) can be used. It is also possible that the drive and output side of the transmission are reversed while the remaining arrangement is maintained.

The input clutch 2, the primary clutches 4 and the secondary clutches 5 each comprise a functionally identical structure. Specifically, in each case a cage 7 as well as a plurality of in each case alternately arranged outer lamellae 8 and inner lamellae 9 are provided. The disk-shaped outer lamellae 8 each comprise an external toothing (not further illustrated), which correspond with an inner toothing (not further illustrated) of the cage 7, and the disk-shaped inner lamellae 9 comprise an inner toothing (not further illustrated), which correspond with an outer toothing (not further illustrated) of a wave section (in the illustrated exemplary embodiment of an output side shaft section of the primary shafts 1 and the driven shaft 19 of the drive unit 3). The outer lamellae 8 can be pre-mounted on an outer lamellae carrier (not further illustrated), and the inner lamellae can be pre-mounted in an inner lamellae carrier (not further illustrated). An initial position of the clutches 2, 4, 5 can be maintained defined without external force application by a spring assembly (not further illustrated). The initial position can be a coupled position or a decoupled position.

The primary shaft 1 of the first transmission section 18 can be coupled to the driven shaft 19 on the drive side via the input clutch 2. To that end, the free shaft end of the driven shaft 19 comprises the outer toothing for receiving the inner lamellae 9 of the input clutch 2 and the primary shaft 1 of the first of the transmission sections 18 on the drive side A comprises the cage 7 of the input clutch 2. The cage 7 can be positioned and secured on the drive side shaft end via suitable means such as a toothing, thread, key or the like. For coupling the driven shaft 19 to the primary shaft 1 of the first transmission section 18, the outer lamellae are pressed against the inner lamellae through a pressure ring (not illustrated in detail) or the like and in that way, the input clutch 2 is brought into a coupled state.

On the drive side, the primary shafts 1 of all except for the last of the transmission sections 18 can be coupled to the primary shaft 1 of the respective following transmission section 18 via the primary clutch 4 thereof. The primary shaft 1 of each following transmission section 18 can thus also be seen as a driven shaft of the respective preceding transmission section 18. The primary shaft 1 of the last of the transmission sections 18 can be coupled to the output shaft 20 via the primary clutch thereof on the drive side. The output shaft 20 is a driven shaft of the last transmission section 18 and can also be seen as driven shaft of the entire transmission. To that end, the driven shafts of all transmission sections 18 (i.e., the primary shaft 1 of the following transmission sections 18 on their respective drive sides A or the output shaft 20) comprise cages 7 of the respective primary clutch 4 in the same way as the primary shaft 1 of the first transmission section. For coupling the primary shafts 1 of the transmission sections 18 to the respective driven shafts thereof, the cage 7 of the driven shaft is brought into the coupled state with respect to the primary shaft 1 through the pressure ring 16.

The cage 7 of the secondary clutch 5 of each transmission section is connected to the respective first gear wheel 6, which is loosely mounted on the primary shaft 1. The pressure ring 16 can bring the secondary clutch into the coupled state only as an alternative to the primary clutch 4. In other words, if the primary clutch 4 is coupled, the secondary clutch 5 is decoupled and vice versa. If the secondary clutch 5 is coupled, the primary clutch 4 is decoupled and the power flux from the primary shaft 1 to the driven shaft (primary shaft 1 of the following transmission section 18 or output shaft 20) is interrupted. Instead, now the first gear wheel 6 is carried along by the primary shaft 1 via the secondary clutch 5. The first gear wheel 6, together with the second gear wheel 14 fixedly arranged on the secondary shaft 13, forms the first gear set which drives the secondary shaft 13 at a predetermined transmission ratio with respect to the primary shaft 1. Furthermore, the third gear wheel 15 fixedly arranged on the secondary shaft 13 forms, together with fourth gear wheel 12 fixedly arranged on the driven shaft (primary shaft 1 of the following transmission section 18 or output shaft 20), the second gear set which drives the driven shaft at a predetermined transmission ratio with respect to the secondary shaft 13. In this way, the secondary shaft 13 is coupled into the power flux by the secondary clutch 5. The transmission ratios of the first gear set 10 and the second gear set 11 are combined into a single transmission ratio of the transmission section 18. The positions I to IV of the transmission sections 18 are counted from the transmission section 18 with the lowest transmission ratio to the transmission section 18 with the highest transmission ratio. However, this is an exemplary convention and not mandatory.

Each transmission section 18 of this exemplary embodiment can thus take two shift positions, and each shift position of a transmission section 18 can be combined with each shift position of each other transmission section 18.

For the further description of this exemplary embodiment with one secondary shaft axis per transmission section 18, the actuation or coupling of the primary clutch 4 be defined as <0>, and the actuation of the secondary clutch 5 as <1>. If each transmission section is seen as one digit of a dual number, in which each digit can take on the values <0> or <1>, the transmission of this exemplary embodiment can be interpreted as an illustration of a dual number system with four digits and each gear (each gear) can be described as a number in dual notation. That is, as 2^4=16 numerical values can be illustrated with four digits in a dual number system, the same amount, namely 2^4=16 gears can be realized with the transmission of this exemplary embodiment.

Theoretically, any number (preferably four to six) of these primary shafts 1 and secondary shafts 13 can be connected in series, wherein with each combination of primary and secondary shafts, the number of possible gears doubles.

Although in FIG. 1 all clutches 2, 4, 5 are illustrated in a decoupled position, it is understood that this is a schematic illustration only. In a preferred configuration of this exemplary embodiment, all primary clutches 4 are coupled in an initial position (and thus the secondary clutches 5 are decoupled). Thus, in the initial position, the transmission sections 18 in the position <0> <0> <0> <0> (that is the number zero in dual notification) represent the first gear of the transmission as a power flux through the primary shafts 1. Shifting into position <1> of a transmission section 18, whereby the power flux is guided through the respective secondary shaft 13, is effected by actuating the respective pressure 16 ring then.

The primary shafts 1 and the secondary shafts 13 are arranged axis-parallel. It is understood that in each transmission section 18, the second gear wheel 14 of the secondary shaft 13 is permanently engaged to the first gear wheel 6 of the primary shaft 1, while the third gear wheel 15 of the secondary shaft 13 is permanently engaged to the fourth gear of the next primary shaft 1 or the output shaft 20. A secondary shaft 13 connects two subsequent primary shafts 1, if the clutches 4, 5 are in shift state <1>, and two subsequent primary shafts 1 are directly connected, if the clutches 4, 5 are in shift state <0>. If the pairs of gear wheels 6, 14 and 15, 12 of all secondary shafts 13, same module given, comprise the same tooth amounts of the pairs upon different teeth numbers, the secondary shafts 13 can also be arranged coaxially.

The primary shafts 1 can be formed as hollow shafts. A (continuous) support shaft (not illustrated in detail) can be integrated in the hollow primary shafts 1 to relieve the mounting of the primary shafts 1. In the same way, the secondary shafts 13 can be formed as hollow shafts into which a (continuous) support shaft (not illustrated in detail) can be integrated if they align as it is the case in the exemplary embodiments shown in FIGS. 1, 2, 5A-5I.

Figure 2:
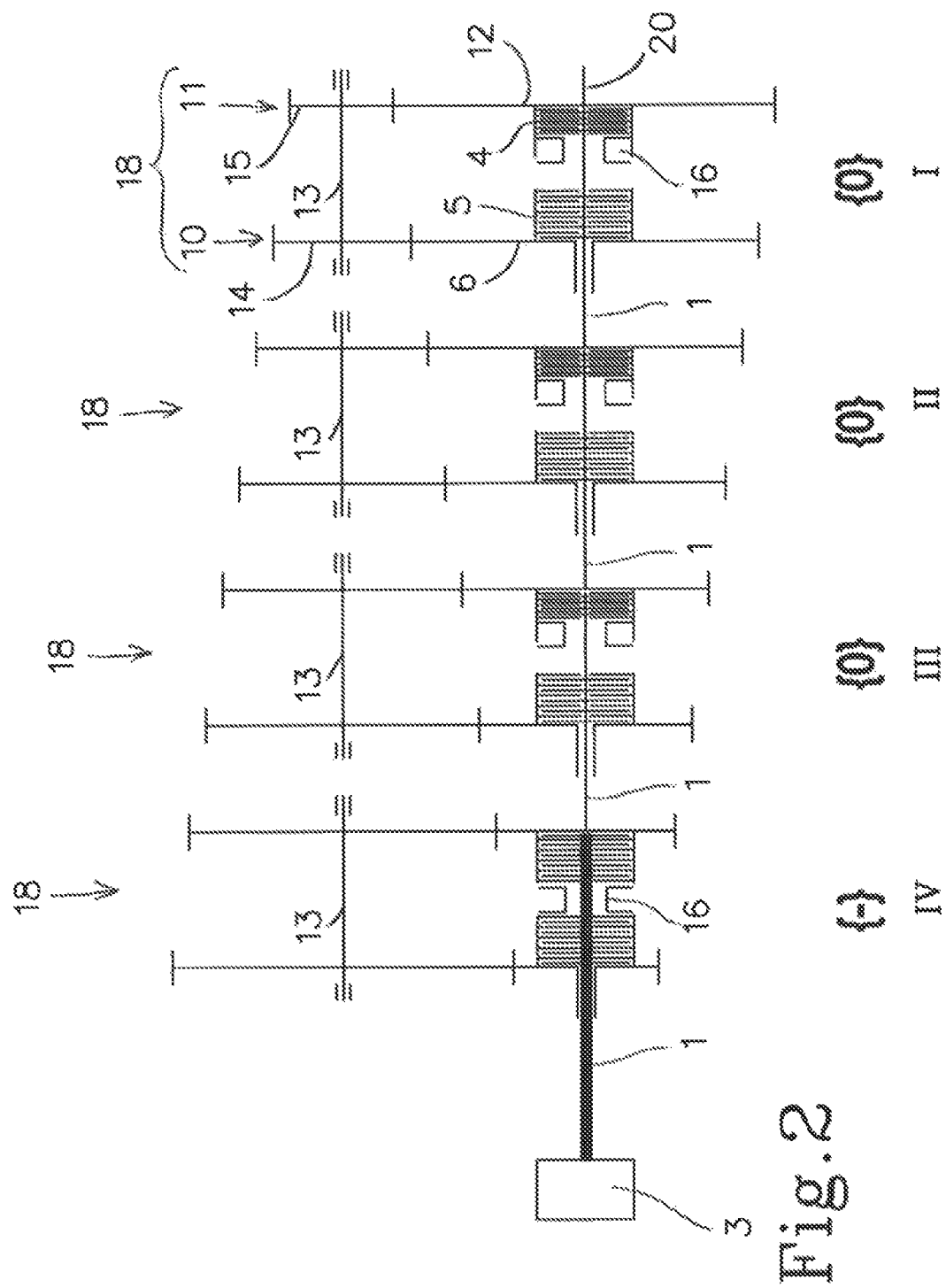
FIG. 2 a schematic illustration of a transmission according to another exemplary embodiment of the present invention.

FIG. 2 is a schematic illustration of a transmission according to another exemplary embodiment of the present invention.

The transmission of this exemplary embodiment is a modification of the transmission of the exemplary embodiment of FIG. 1. As far as nothing different is described below, the transmission of this exemplary embodiment coincides with the transmission of the exemplary embodiment of FIG. 1. That is, only the differences to the transmission of the exemplary embodiment of FIG. 1 are described in the following, while for the rest, reference is made to the description of FIG. 1.

In the present exemplary embodiment, it is assumed that for each transmission section 18 except for the first one, only one of the shift positions <0> and <1> is possible, that is, either the primary clutch 4 or the secondary clutch 5 is coupled. For the first transmission section 18 in contrast, also a neutral position (<–>), also called idle position, is possible, in which neither the primary clutch 4 nor the secondary clutch 5 is coupled. Therefore, this pair of clutches of the first transmission section 18 can take over the function of the input clutch 2 between primary shaft 1 and power source 3, which can thus be omitted. As illustrated in FIG. 2 as a bold solid line, the power flux runs from the stably attached drive unit 3 only till the primary shaft 1 of the first transmission section 18, so that no torque is transmitted to the output shaft 20. In other words, compared to the exemplary embodiment of FIG. 1, the input clutch 2 is replaced by a clutch of the transmission in this exemplary embodiment. It is to the understood that this function of separating the drive train can be realized by any cooperating clutches.

The succession of the transmission sections 18 is switched as a further difference to the exemplary embodiment of FIG. 1. That is, the transmission section 18 of the lowest transmission (position I) is arranged on the side of the output shaft 20 and thus forms the last transmission section 18 and the transmission section 18 with the highest transmission (positions IV) is arranged on the side of the input clutch 2 and thus forms the first transmission section 18.

Figure 3:
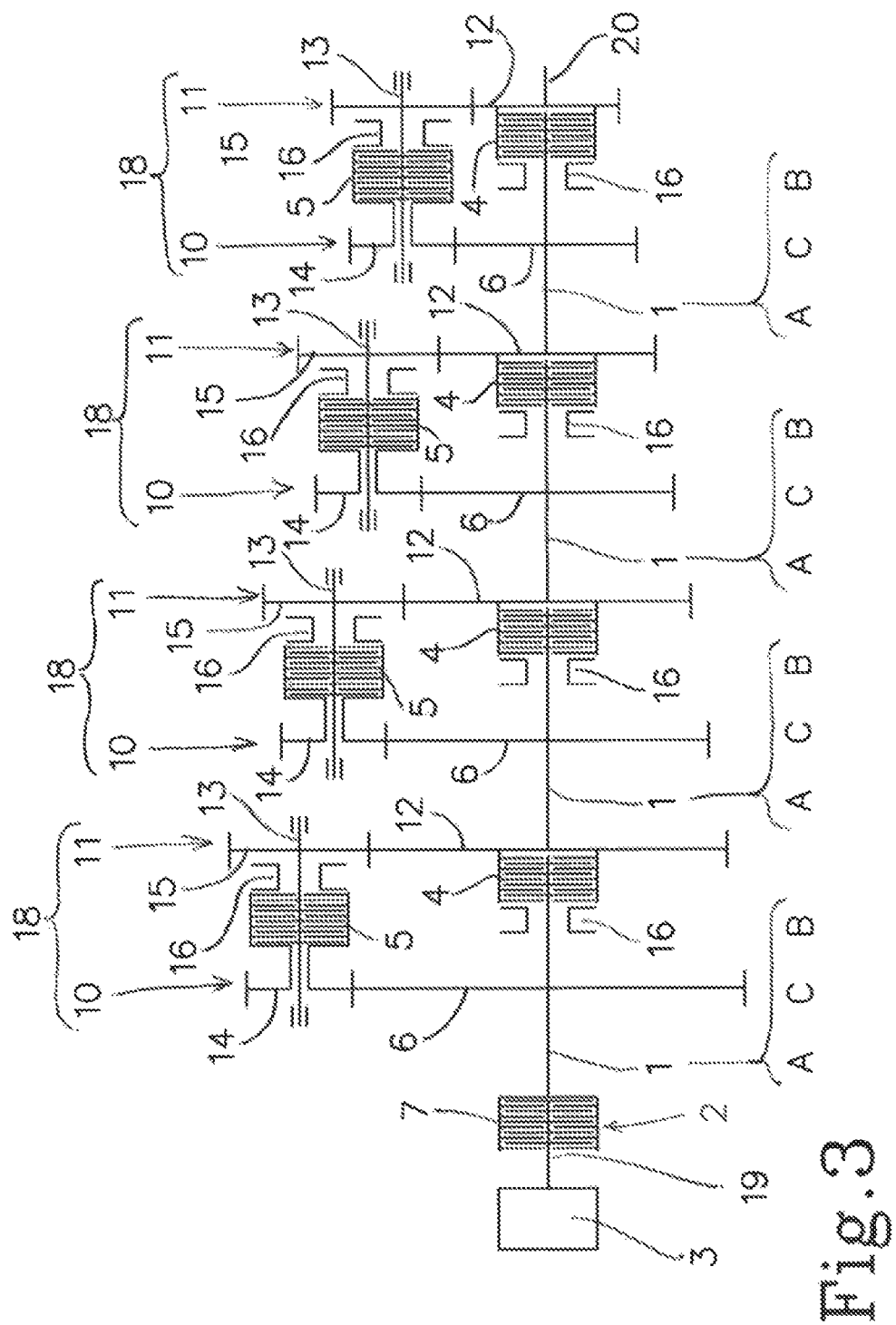
FIG. 3 a schematic illustration of a transmission according to a further exemplary embodiment of the present invention.

FIG. 3 is a schematic illustration of a transmission according to another exemplary embodiment of the present invention.

The transmission of this exemplary embodiment is a modification of the transmission of the exemplary embodiment of FIG. 1. As far as nothing different is described below, the transmission of this exemplary embodiment coincides with the transmission of the exemplary embodiment of FIG. 1. That is, only the differences to the transmission of the exemplary embodiment of FIG. 1 are described in the following, while for the rest, reference is made to the description of FIG. 1.

The order of the transmission sections 18 is reversed as a further difference to the exemplary embodiment of FIG. 1. That is, the transmission section 18 of the lowest transmission (position I) is arranged on the side of the output shaft 20 and the transmission section 18 with the highest transmission (position IV) is arranged on the side of the input clutch 2.

In the transmission of this exemplary embodiment, the secondary clutch 5 is arranged on or in the secondary shaft 13, the first gear wheel 6 is arranged co-rotationally on the primary shaft 1 and the second gear wheel 14 is loosely arranged on the secondary shaft 13. Like in the first exemplary embodiment, the third gear wheel 15 is seated co-rotationally on the secondary shaft 13 and the fourth gear wheel 12 is seated co-rotationally on the primary shaft 1.

The second gear wheel 14 (loose wheel) is connected to the cage 7 of the secondary clutch 5, and the inner lamellae (here, not indicated in detail) of the secondary clutch 5 are located on the secondary shaft 13.

The primary clutch 4 and the secondary clutch 5 are in each case actuatable by a distinct pressure ring 16. The pressure rings 16 of the primary clutch 4 and the secondary clutch 5 are coupled by a suitable logics and/or control (not illustrated in detail) in such a way that the primary clutch 4 and the secondary clutch 5 can take on the coupled position as an alternative only. In other words, if the primary clutch 4 is coupled, the secondary clutch 5 is decoupled (shift position <0> of the transmission section 18), and if the secondary clutch 5 is coupled, the primary clutch 4 is decoupled (shift position <1> of the transmission section 18).

FIG. 4 is a schematic illustration of a transmission according to yet another exemplary embodiment of the present invention.

The transmission of this exemplary embodiment is a modification of the transmission of the exemplary embodiment of FIG. 3. As far as nothing different is described below, the transmission of this exemplary embodiment coincides with the transmission of the exemplary embodiment of FIG. 3. That is, only the differences to the transmission of the exemplary embodiment of FIG. 3 are described in the following, while for the rest, reference is made to the description of FIG. 3.

Based on the preceding exemplary embodiment according to FIG. 3, in which the secondary clutches 5 are located on the secondary shafts 13, it is also possible according to the illustration in FIG. 4 in a further exemplary embodiment to arrange two secondary shafts 13a, 13b parallel to the primary shaft 1 for connecting two subsequent primary shafts 1, on which are as well located respective second gear wheels 14a, 14b and third gear wheels 15a, 15b, wherein these second gear wheels 14a, 14b are as well permanently engaged with the first gear wheels 6 of the primary shafts 1, while the third gear wheels 15a, 15b of the secondary shafts 13a, 13b are permanently engaged with a respective fourth gear wheel 12a, 12b which is arranged co-rotationally on the subsequent primary shaft 1 or the output shaft 20. In other words, the first gear wheel 6 forms a first gear set 10a with the second gear wheel 14a of the secondary shaft 13a as well as further first gear set 10b with the second gear wheel 14b of the secondary shaft 13b; furthermore, the third gear wheel 15a of the secondary shaft 13a and the fourth gear wheel 12a form a second gear set 11a and the third gear wheel 15b of the secondary shaft 13b and the other fourth gear wheel 12b form another second gear set 11b.

The primary clutch 4 and the secondary clutches 5a, 5b each are actuatable by a distinct pressure ring 16. The pressure rings 16 of the primary clutch 4 and of the secondary clutches 5 are coupled by a suitable logics and/or control (not illustrated in detail) in such a way that the primary clutch 4 and the secondary clutches 5a, 5b can take on the coupled position as an alternative only. In other words, if the primary clutch 4 is coupled, the secondary clutches 5a, 5b are decoupled (shift position <0> of the transmission section 18), and if one of the secondary clutches 5a, 5b is coupled, the primary clutch 4 is decoupled as the other one of the secondary clutches 5a, 5b. That is, with each of the secondary clutches 5a, 5b or the secondary shafts 13a, 13b, a further shift position of the transmission section 18 can be shifted, which can be seen as shift positions <1> and <2> of the transmission section 18 in continuation of precedingly introduced notification. This ternary way of functioning of the transmission corresponds to a number system with an exponent corresponding to the amount of transmission sections 18 and a basis (3) corresponding to the amount of shift positions per transmission section 18 which underlies the number system. It is understood that the basis of the number system corresponds to the amount of secondary shafts 13 per transmission section 18 plus one and the respective transmission sections 18 correspond to the digits of a number represented in this number system.

In further developments of this exemplary embodiment, which are not illustrated in detail herein, more than two secondary shafts can be arranged parallel to the respective primary shaft in each transmission section and can alternatively be couplable by means of corresponding secondary clutches.

In a further, exemplary embodiment, not illustrated in detail, it may be provided that further secondary shafts are arranged parallel to the secondary shafts 13, 13a and/or 13b, which are provided with secondary clutches like the secondary shafts 13, 13a or 13b to be alternatively coupled in the force path.

In a further, exemplary embodiment, not illustrated in detail herein, it is also possible that the gear wheel 15b as well engages the gear wheel 12a with a respective tooth number, wherein the gear wheel 12b can be omitted then. Analogously, this applies as well for multiple, not coaxial secondary shafts.

Further exemplary embodiments, not illustrated in detail, relate to hybrids of the above-described exemplary embodiments in which, for example, only one or multiple clutches is/are located on the secondary shaft and couple or decouple it, while only one or multiple primary shafts 1 are designed with coupleable loose wheels 6.

In order to switch the rotational direction of a primary shaft 1 and thereby the drive rotational direction, a force transmission has to be effected between primary shaft 1 and secondary shaft 13 either via an intermediate gear wheel or via a tie (e.g. gear train, gear belt etc.). This is possible at any place within the transmission.

The transmission according to the invention is suitable for use in engine-driven or muscle-driven vehicles of all types as well as for heat engines, power machines or processing machines of all types and applications.

When applying in a muscle-driven vehicle such as a bicycle it is particularly preferably that the shifting of the individual gears can be effected using only one single actuator (e.g. a rotary handle) and that there are no intersection regions or leaps in the gear sequence.

FIGS. 5A to 5I are schematic illustrations of a transmission of a further exemplary embodiment in different shift positions with indication of a power flux.

The transmission of this exemplary embodiment is a modification of the transmission of the exemplary embodiment of FIG. 1. As far as nothing different is described below, the transmission of this exemplary embodiment coincides with the transmission of the exemplary embodiment of FIG. 1. That is, only the differences to the transmission of the exemplary embodiment of FIG. 1 are described in the following, while for the rest, reference is made to the description of FIG. 1.

The only difference to the exemplary embodiment of FIG. 1 is that the order of the transmission sections 18 is switched. That is, the transmission section 18 of the lowest transmission is arranged on the side of the output shaft 20 and the transmission section 18 with the highest transmission is arranged on the side of the input clutch 2. The drive unit 3 of FIG. 1 is omitted for reasons of clearness only. The positions I to IV of the transmission sections 18 are counted again from the transmission section 18 with the lowest transmission to the transmission section 18 with the highest transmission.

Subsequently, the functioning of the transmission of this exemplary embodiment is described in detail.

It is possible with a transmission section 18 to shift for example an operating state <0> (i.e. directly driven) or <1>, (driven via the secondary shaft 13 and the gear wheels 14 and 15 thereof) or vice versa.

Already 4 operating states or gears are possible with two transmission sections 18, namely with <0> in the first and <0> in the second transmission section 18 directly driven (first gear), with <0> in the first and <1> in the second transmission section 18 shifting to a second gear, with <1> in the first and <0> in the second transmission section 18 shifting to a third gear, and with <1> in the first and <1> in the second transmission section 18 shifting to a fourth gear, wherein the fourth gear is formed as a product of the first and second transmission section 18. Depending on the selected transmission ratio of the secondary shafts 13, the second gear can also be shifted with <1> in the first and <0> in the second transmission section 18 and the third gear with <0> in the first and <1> in the second transmission section 18.

With each additional transmission section 18, the number of possible gears apparently doubles which is described with reference to the table 1 below. The first column with a position V (not provided in the present exemplary embodiment) and the lines with gears 17 to 32 possible therewith is to illustrate that the number of gears can be doubled on and on by simply adding a further position.

TABLE 1

Figure 5B:
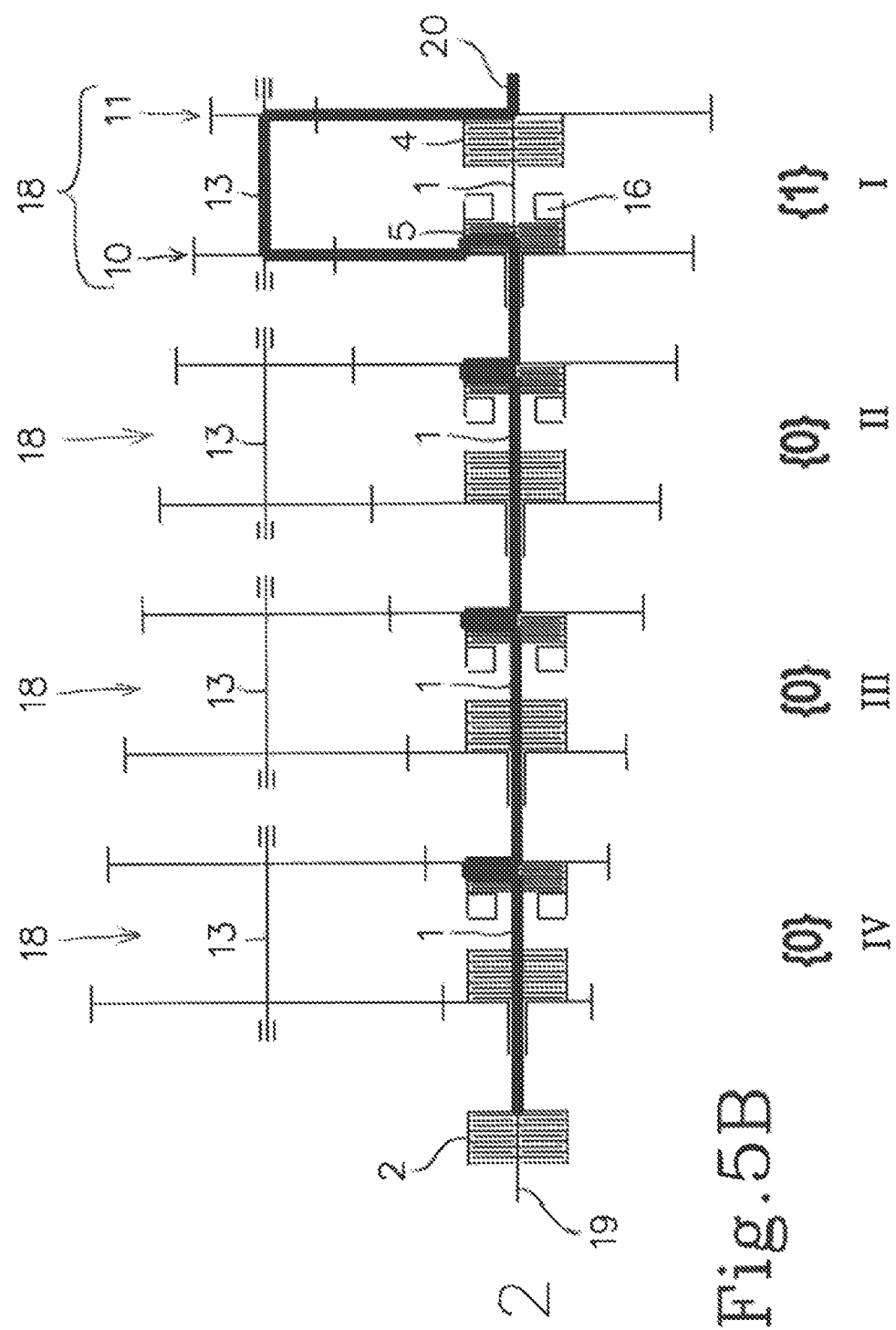
Figure 5C:
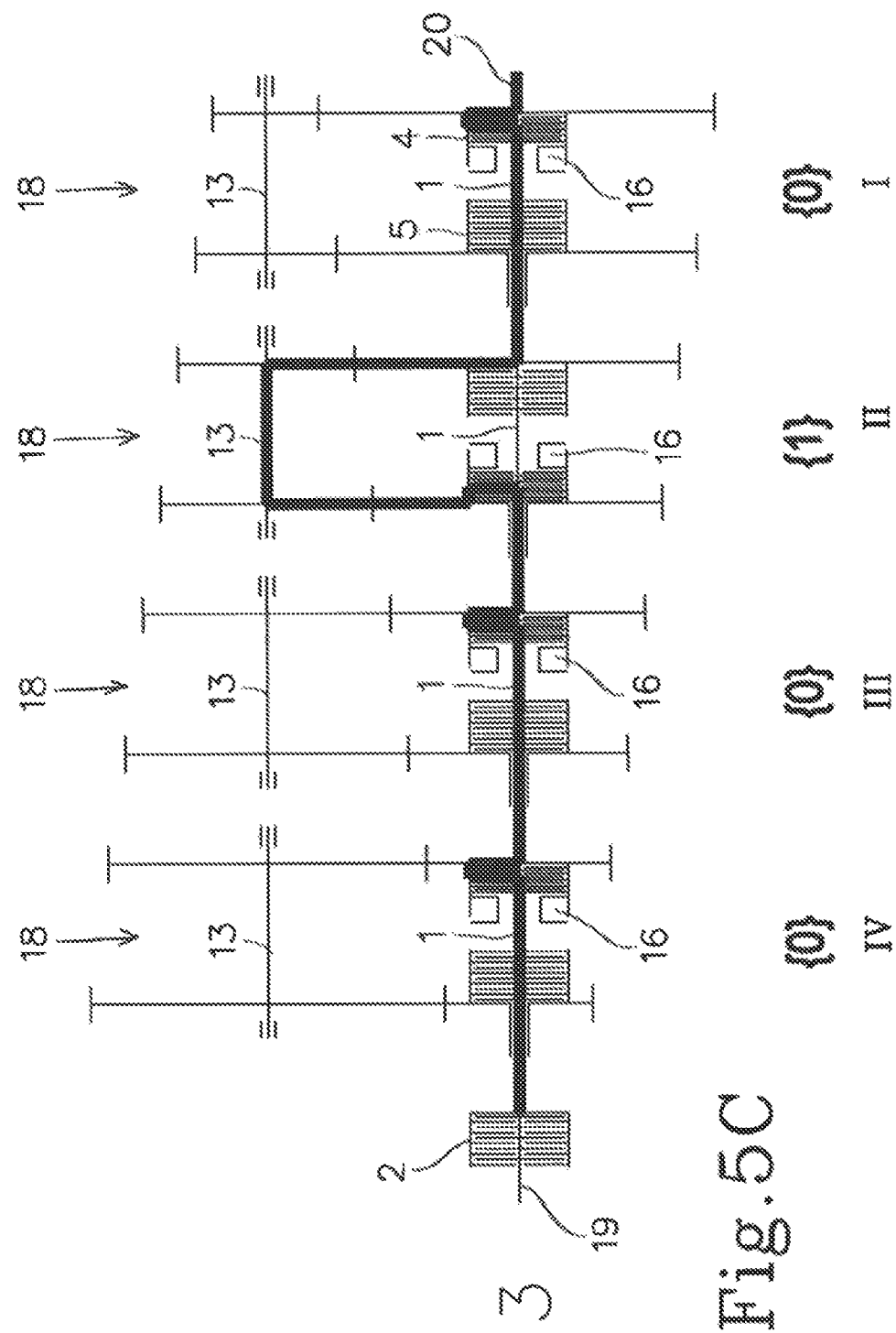
Figure 5F:
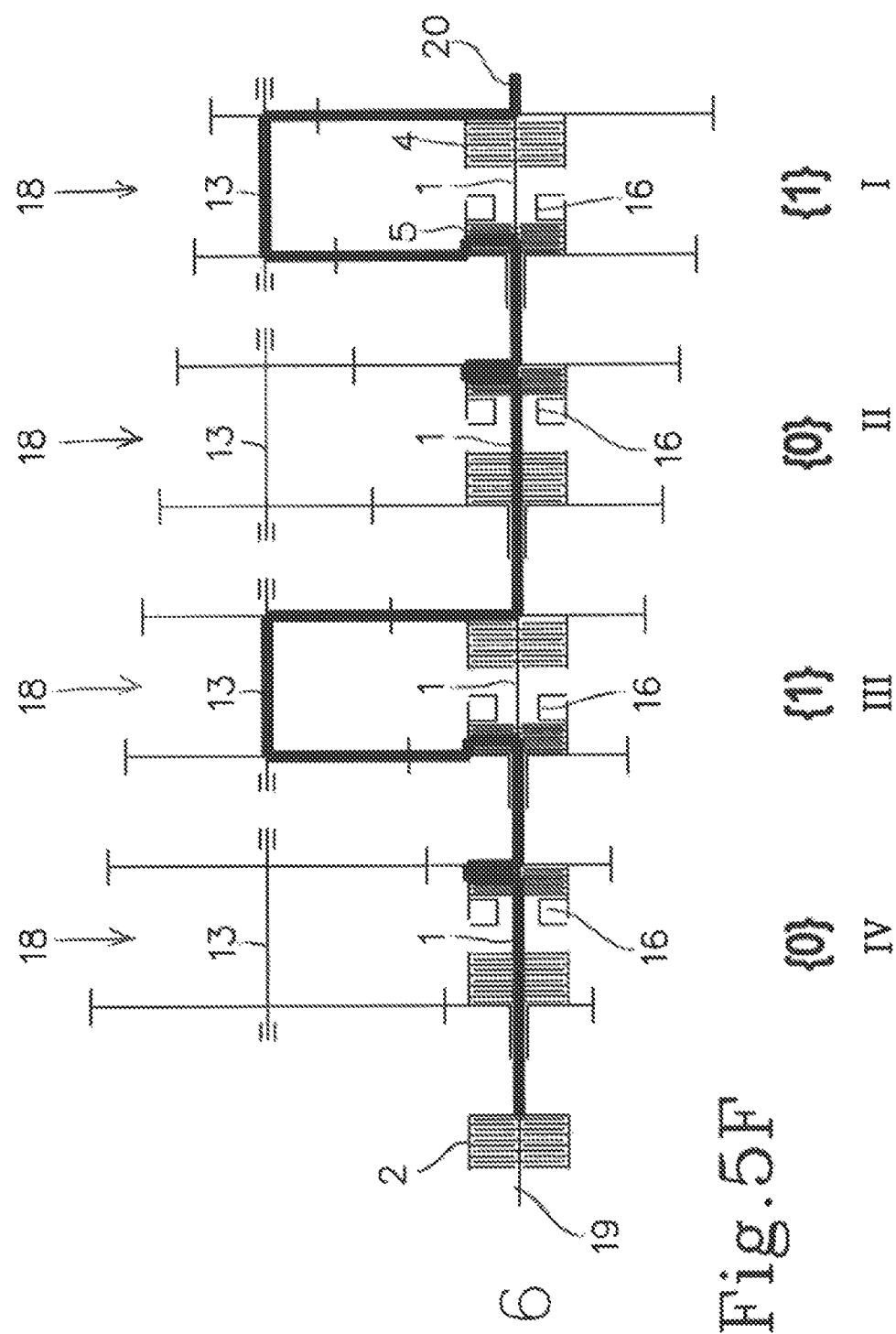
Figure 5H:
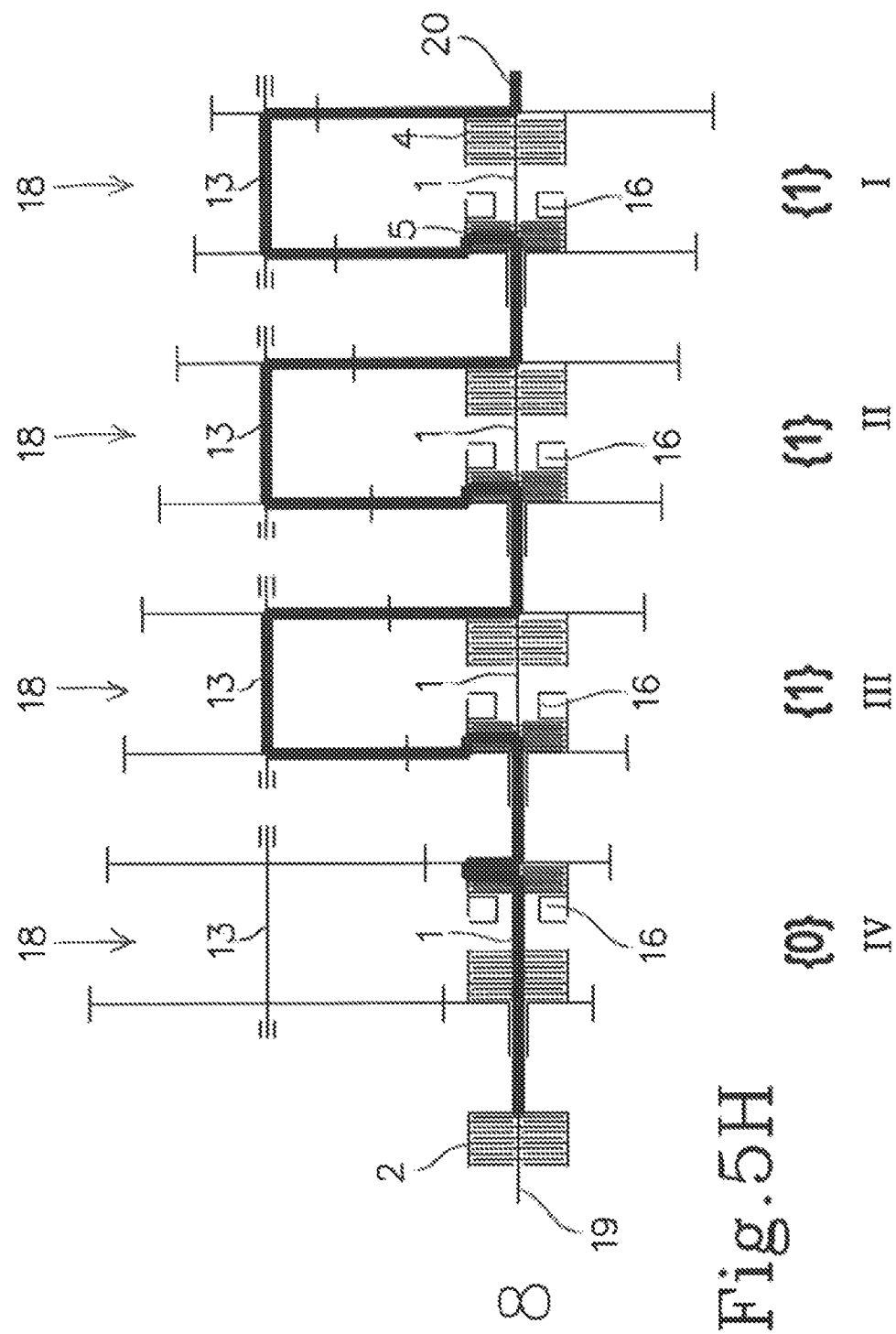
Figure 6B:
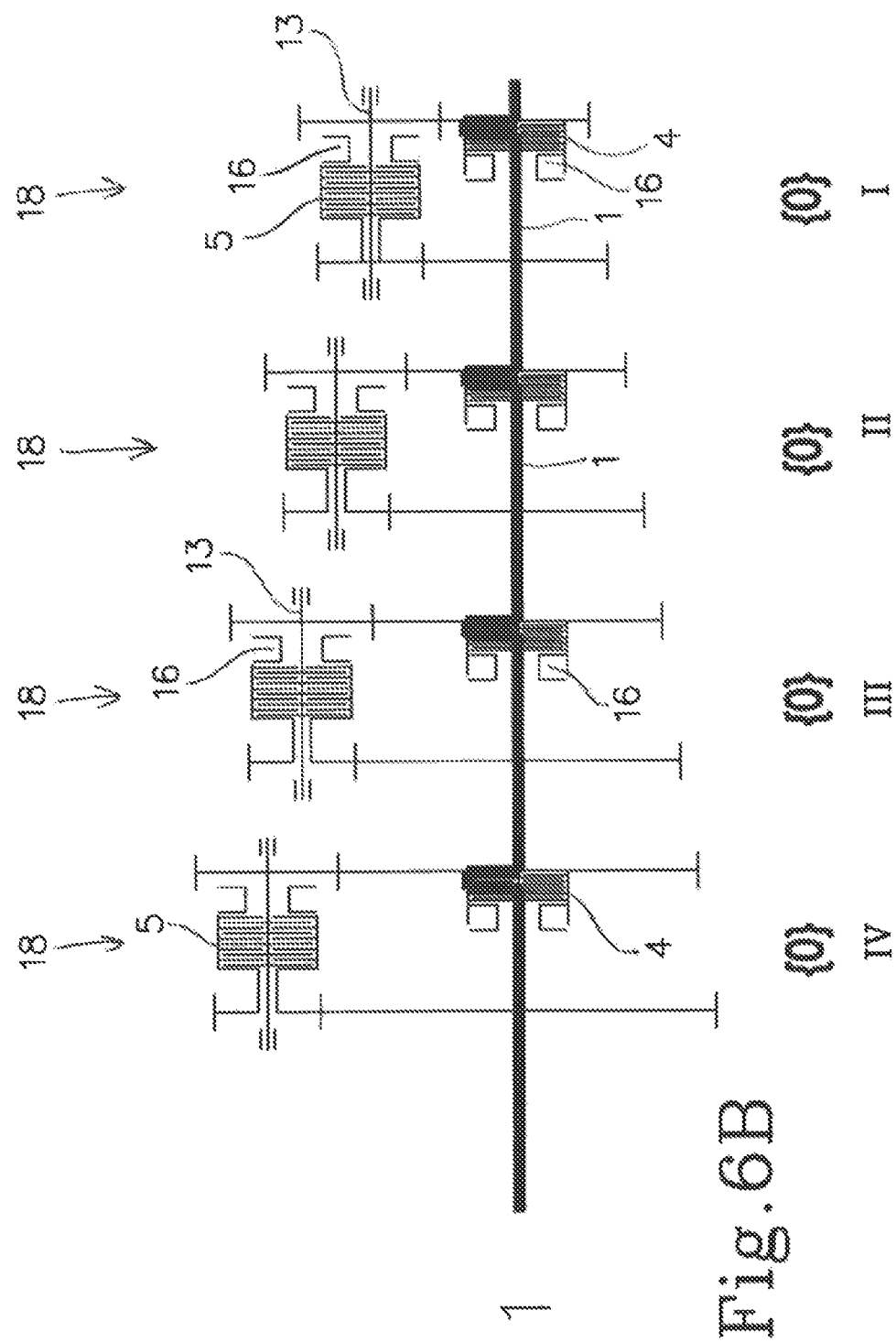
Figure 6C:
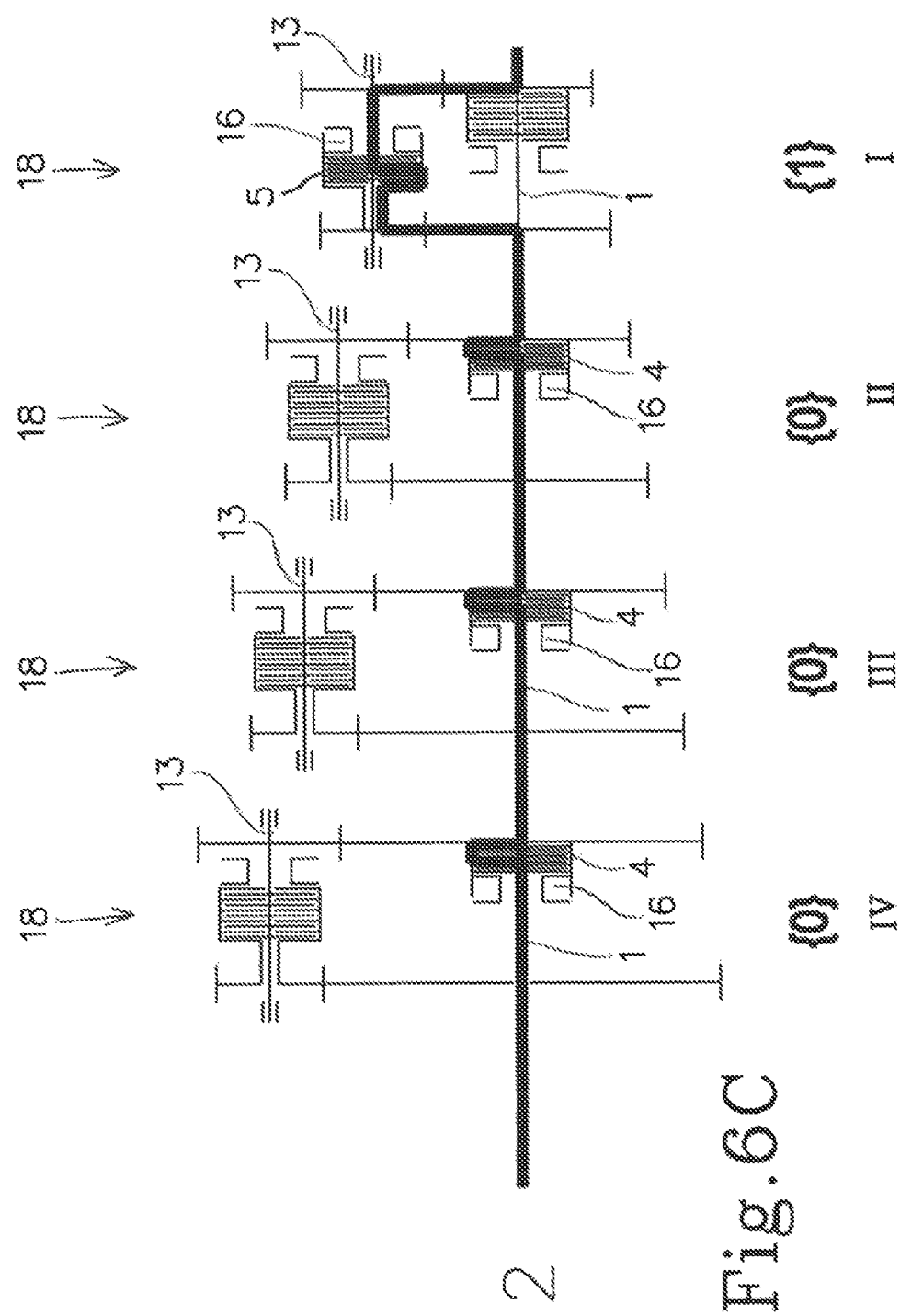
Figure 6D:
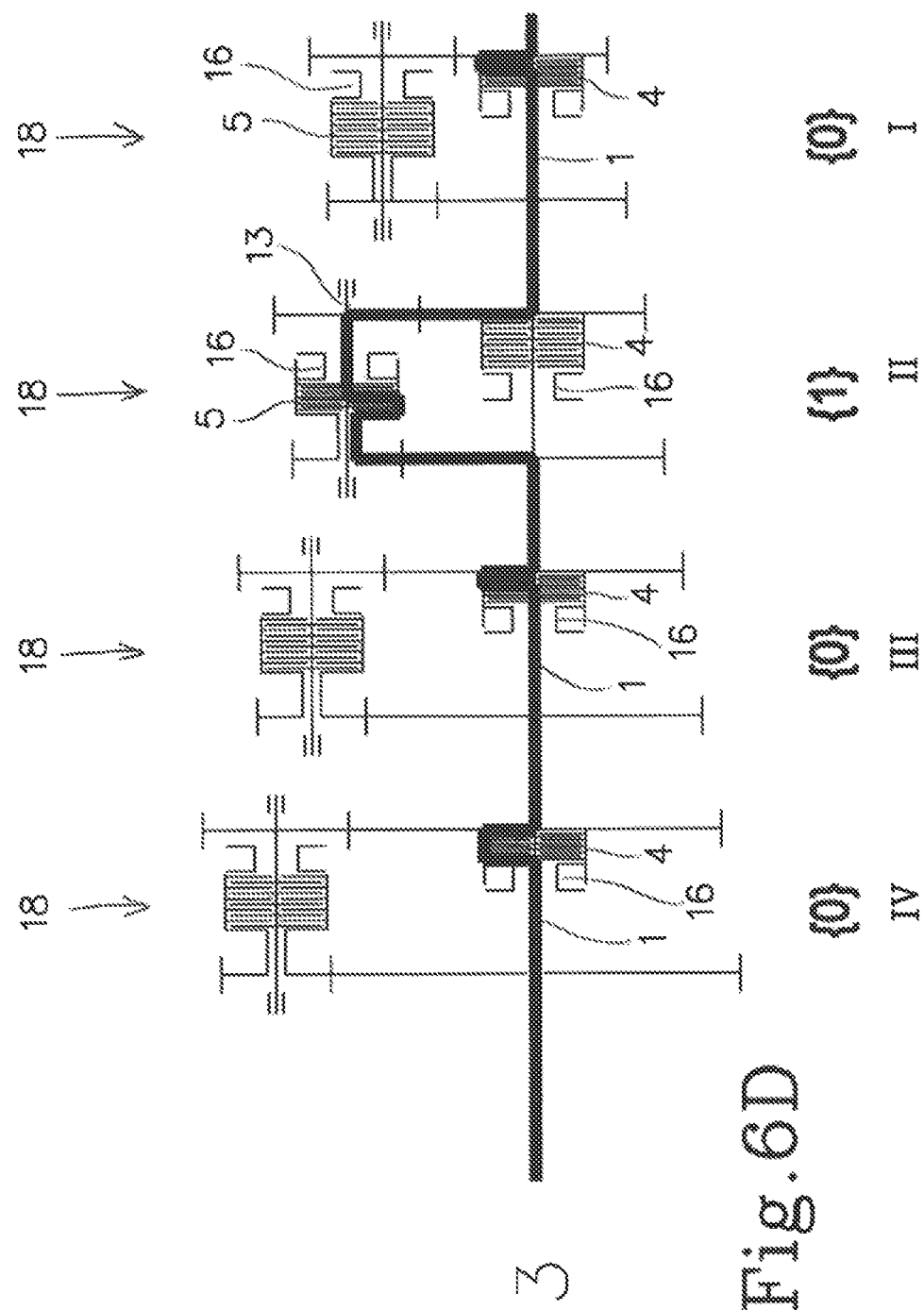
Figure 6H:
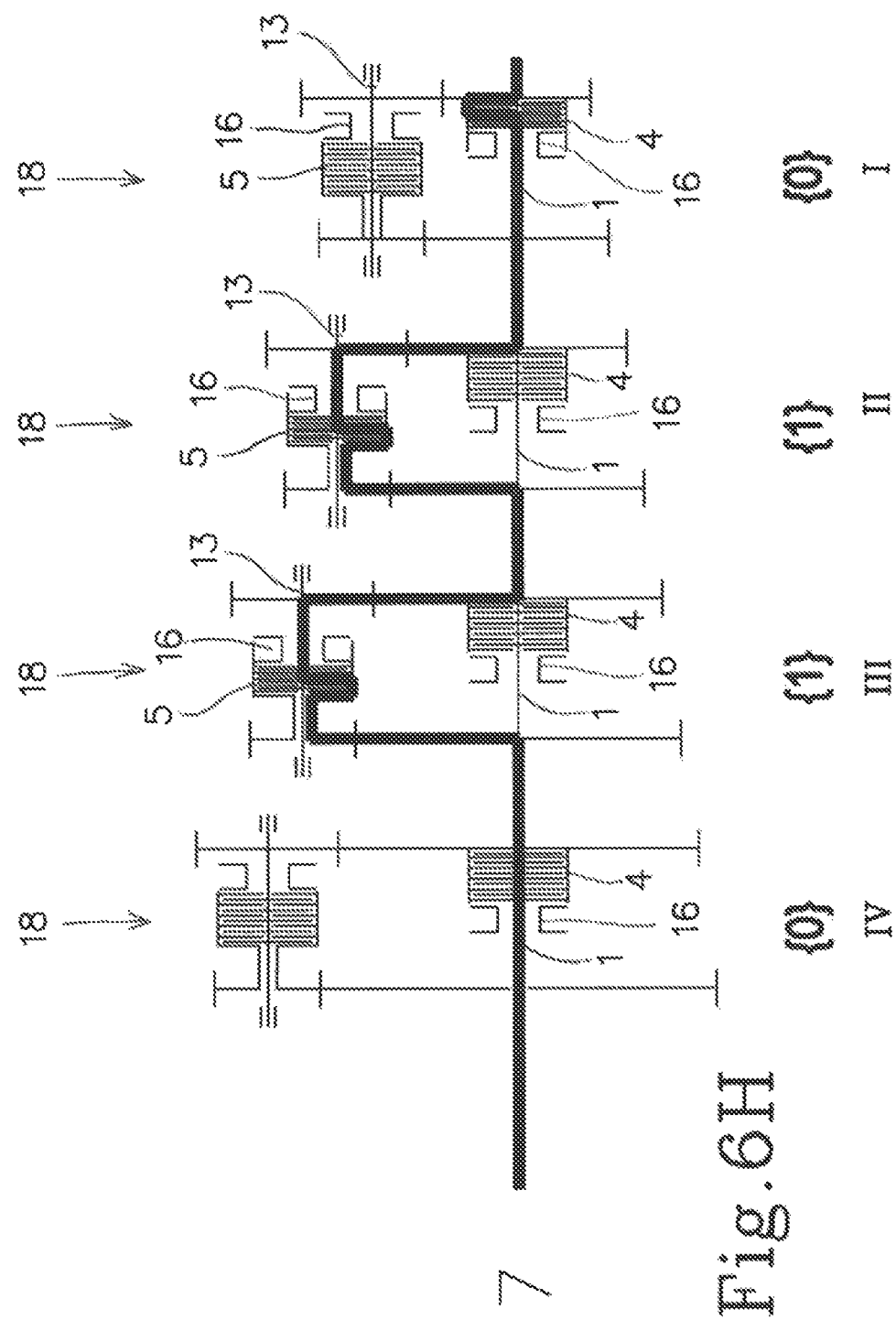
Figure 6J:
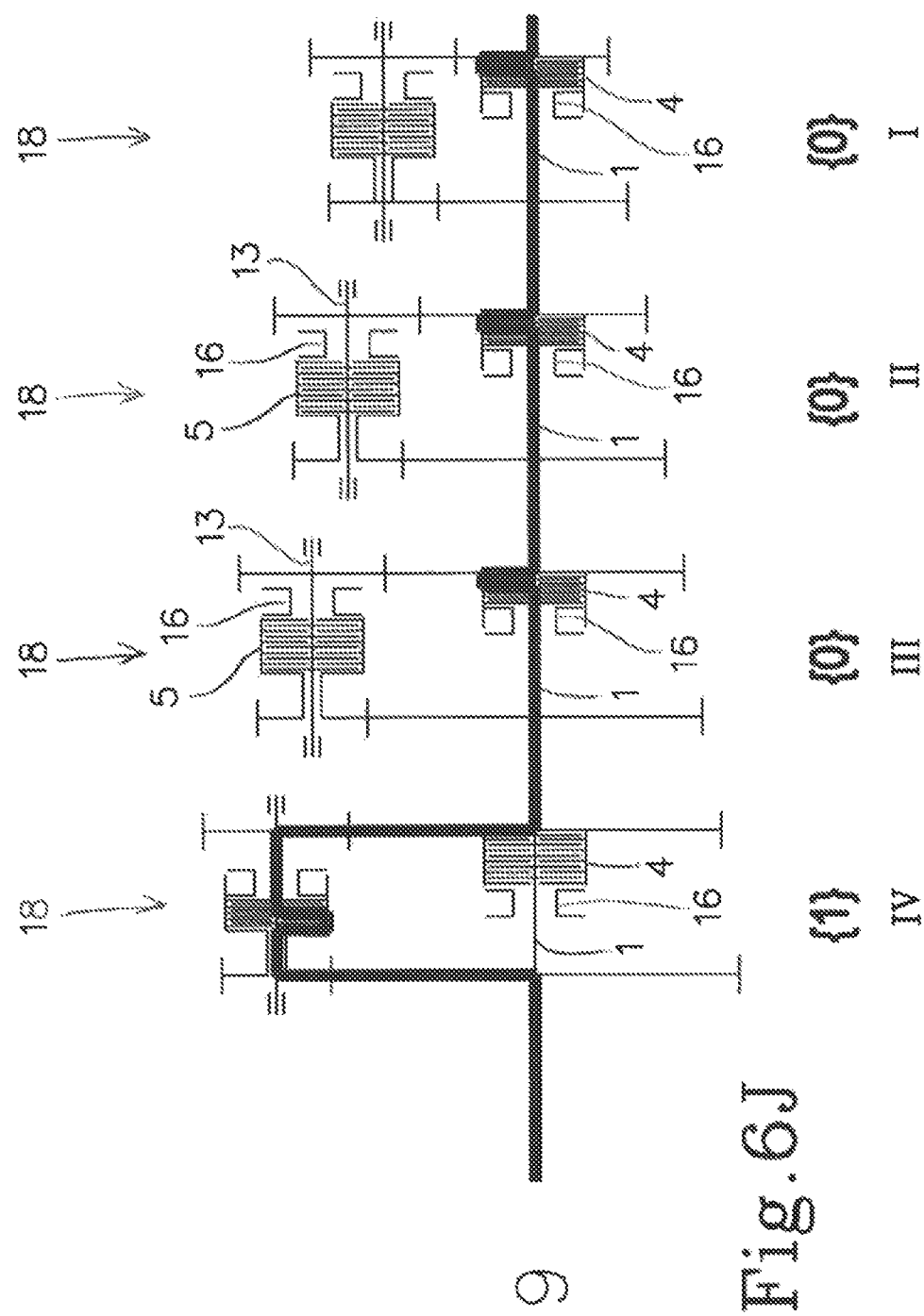

| Shift position for transmission section 18 at the position: | | | | | | |
|---|---|---|---|---|---|---|
| (V) | IV | III | II | I | Gear | FIG. |
| <0> | <0> | <0> | <0> | <0> | 1$^{st}$ Gear (direct) | FIG. 5A |
| <0> | <0> | <0> | <0> | <1> | 2$^{nd}$ Gear | FIG. 5B |
| <0> | <0> | <0> | <1> | <0> | 3$^{rd}$ Gear | FIG. 5C |
| <0> | <0> | <0> | <1> | <1> | 4$^{th}$ Gear | FIG. 5D |
| <0> | <0> | <1> | <0> | <0> | 5th Gear | FIG. 5E |
| <0> | <0> | <1> | <0> | <1> | 6$^{th}$ Gear | FIG. 5F |
| <0> | <0> | <1> | <1> | <0> | 7$^{th}$ Gear | FIG. 5G |
| <0> | <0> | <1> | <1> | <1> | 8$^{th}$ Gear | FIG. 5H |
| <0> | <1> | <0> | <0> | <0> | 9$^{th}$ Gear | FIG. 5I |
| <0> | <1> | <0> | <0> | <1> | 10$^{th}$ Gear | |
| <0> | <1> | <0> | <1> | <0> | 11$^{th}$ Gear | |
| <0> | <1> | <0> | <1> | <1> | 12$^{th}$ Gear | |
| <0> | <1> | <1> | <0> | <0> | 13$^{th}$ Gear | |
| <0> | <1> | <1> | <0> | <1> | 14$^{th}$ Gear | |
| <0> | <1> | <1> | <1> | <0> | 15$^{th}$ Gear | |
| <0> | <1> | <1> | <1> | <1> | 16$^{th}$ Gear | |
| <1> | <0> | <0> | <0> | <0> | (17$^{th}$ Gear) | |
| | | | | | etc. | |
| <1> | <1> | <1> | <1> | <1> | (32$^{nd}$ Gear) | |

The sequence of the shift positions and the assigning thereof to the number of the gear is merely exemplary. Of course, it is possible to form a transmission operating in such a way so that a position <0> or <1> of a certain transmission section 18 is also located at another position than the one indicated in the table, so that, for example, the transmission section <1> for the first gear is located at position III instead of position I etc.

The table 1 also refers to the imagery of the respective shift positions in FIGS. 5A to 5I. This will be described in detail below.

FIG. 5A shows the transmission of this exemplary embodiment in which all pressure rings 16 are in the shift position <0> and thus the power flux is transmitted from primary shaft 1 to primary shaft 1. The power flux is drawn with a thick line. This shift position <0> <0> <0><0> can be seen as first gear of the transmission.

FIG. 5B shows the transmission of this exemplary embodiment in which the three pressure rings 16 of the transmission sections 18 at positions IV, III and II are located in the shift position <0> and the pressure ring 16 of the transmission section 18 at the position I is in the shift position <1>. Thus, the power flux is transmitted from primary shaft 1 to primary shaft 1, from the first through third primary shafts 1, while in the last transmission section at position I, the power flux is bypassed, via the secondary shaft 13, to the output (output shaft 20). Here as well, the power flux is drawn with a thick line. This shift position <0><0> <0> <1> can be seen as second gear of the transmission.

FIG. 5C shows the transmission of this exemplary embodiment in which the three pressure rings 16 of the transmission sections 18 at the positions IV, III and I are located in the shift position <0>, while the pressure ring 16 of the transmission section 18 at position II is in the shift position <1>. Thereby, the power flux results directly from the first to the second primary shafts 1, in the third transmission section 18 at position II, the power flux is directed to the primary shaft 1 of the fourth transmission section 18 at position I via the secondary shaft 13 and from there directly to the output shaft 20. Here as well, the power flux is drawn with a thick line. This shift position <0> <0> <1> <0> can be seen as third gear of the transmission.

FIG. 5D shows the transmission of this exemplary embodiment in which the three pressure rings 16 of the transmission sections 18 at the positions IV and III are located in the shift position <0> and the pressure ring 16 of the transmission sections 18 at positions II and I are in the shift position <1>. Thus, the power flux is transmitted from the first to the second primary shaft 1, and in the transmission sections II and I, the power flux is bypassed, via the secondary shafts 13, to the output, thereby multiplying the transmission ratios of the transmission sections I and II. Again, the power flux is drawn with a thick line. This shift position <0> <0> <1> <1> can be seen as fourth gear of the transmission.

FIGS. 5E to 5I analogously correspond to FIGS. 5A to 5D with the continuation of the individual shift positions up to the maximum possible transmission via all four secondary shafts 13.

As already described, the shift logic of the transmission can be compared to a dual number system, wherein the number of transmission sections 18 corresponds to the number of digits of a number in the number system and the possible shift positions of a transmission section 18 correspond to the two conceivable numerical values of each digit (0 and 1). A comparison of the count of gears according to table 1 with the dual number system shows that the gear number always equals the decimal numerical value which is expressed by the highest binary digit, in this case 4 (transmission sections)^2 (primary shaft+secondary shaft) and the numerator of the individual gear is higher by one than the decimal number indicated by the dual number representation represented by the shift positions of the transmission sections 18: <0000>=0→1. gear, <0001>=1→2. Gear, etc.

Due to the fact that all gear wheels 6, 14, 15, 12 are always engaged, it is possible to shift from each engaged gear to any other gear to be selected without necessary synchronization and practically without interruption of the power flux.

Here, the shifting can be effected via a shift drum via individual, preferably electronically and/or hydraulically controlled actuators (not illustrated in detail). Here, it is not necessary to keep to a certain shift sequence. Skipping multiple gears is possible at any time, depending on the selected actuators and the control thereof as well as depending on use.

The principles of functioning of this exemplary embodiment can be directly or analogously transferred to other exemplary embodiments, as is exemplarily illustrated hereinafter with reference to another exemplary embodiment.

FIGS. 6A to 6J are schematic illustrations of a transmission of an even further exemplary embodiment in different shift positions with identification of a power flux.

The transmission of this exemplary embodiment is a modification of the transmission of the exemplary embodiment of FIG. 3. As far as nothing different is described below, the transmission of this exemplary embodiment coincides with the transmission of the exemplary embodiment of FIG. 3. That is, only the differences to the transmission of the exemplary embodiment of FIG. 3 are described in the following, while for the rest, reference is made to the description of FIG. 3.

FIG. 6A shows the transmission with four transmission sections 18 with an arrangement with four axially displaced arranged secondary shafts 13, in which the primary clutches 4 are located on the primary axes for the shift position <0> and the secondary clutches 5 are located on the secondary shafts 13 for the shift position <1>. Insofar, this corresponds to the transmission of the exemplary embodiment of FIG. 3. In contrast to the transmission of FIG. 3, the pair of clutches 4, 5 of the first of the transmission sections 18 (position IV) comprises an idle position (<–>) in which both clutches 4, 5 are decoupled. As already described, this possible idle position can be in any transmission section 18.

FIGS. 6B to 6J show the transmission of this exemplary embodiment in shift positions for the first eight gears according to the shift logic which have been described above for the preceding exemplary embodiment with reference to FIGS. 5A to 5I and the table 1.

FIG. 7 shows the transmission of FIG. 4 in a selected shift position.

The transmission of this exemplary embodiment comprises m=2 parallel secondary shafts 13, that is m+1=3 possible shift positions per transmission section 18 and n=4 transmission sections 18. As described above with respect to FIG. 4, each transmission section 18 can take on three shift positions, namely <0> (primary clutch 4 coupled), <1> (first secondary clutch 5a coupled) or <2> (second secondary clutch 5b coupled). It is to be noted that the technically possible idle position <–> in this exemplary embodiment can not be counted as defined by this application since the idle position does not correspond to any illustratable number in the number system based on the shift logic. If a coupled state of a clutch is indicated with [+] and a decoupled state with [–], the combinations of clutch states of the clutches 4, 5a, 5b are represented according to the following table 2:

TABLE 2

| Clutch | Idle <–> | Shift position <0> | <1> | <2> |
|---|---|---|---|---|
| Primary clutch 4 | [–] | [+] | [–] | [–] |
| first secondary clutch 5a | [–] | [–] | [+] | [–] |
| second secondary clutch 5b | [–] | [–] | [–] | [+] |

The following table 3 clarifies an exemplary shift pattern of the transmission of this exemplary embodiment, wherein the shift positions of the respective transmission sections 18 at the positions I, II, III and IV indicated in table 3 are obtained by the coupling states of the primary clutch 4, the first secondary clutch 5a and the second secondary clutch 5b of the respective transmission sections 18 indicated in table 2.

TABLE 3

| | Shift position in position | | | | |
|---|---|---|---|---|---|
| IV | III | II | I | Gear | FIG. |
| <–> | <0> | <0> | <0> | Idle | FIG. 4 |
| <0> | <0> | <0> | <0> | 1st gear (direct) | |
| <0> | <0> | <0> | <1> | 2nd gear | |
| <0> | <0> | <0> | <2> | 3rd gear | |
| <0> | <0> | <1> | <0> | 4th gear | |
| <0> | <0> | <1> | <1> | $5^{th}$ gear | |
| <0> | <0> | <1> | <2> | $6^{th}$ gear | |
| <0> | <0> | <2> | <0> | $7^{th}$ gear | |
| <0> | <0> | <2> | <1> | $8^{th}$ gear | |
| <0> | <0> | <2> | <2> | $9^{th}$ gear | |
| <0> | <1> | <0> | <0> | $10^{th}$ gear | |
| <0> | <1> | <0> | <1> | $11^{th}$ gear | |
| <0> | <1> | <0> | <2> | $12^{th}$ gear | |
| <0> | <1> | <1> | <0> | $13^{th}$ gear | |
| <0> | <1> | <1> | <1> | $14^{th}$ gear | |
| <0> | <1> | <1> | <2> | $15^{th}$ gear | |
| <0> | <1> | <2> | <0> | $16^{th}$ gear | |
| <0> | <1> | <2> | <1> | $17^{th}$ gear | |
| <0> | <1> | <2> | <2> | $18^{th}$ gear | |
| <0> | <2> | <0> | <0> | $19^{th}$ gear | |
| <0> | <2> | <0> | <1> | $20^{th}$ gear | |
| <0> | <2> | <0> | <2> | $21^{th}$ gear | |
| <0> | <2> | <1> | <0> | $22^{th}$ gear | |
| <0> | <2> | <1> | <1> | $23_{th}$ gear | |
| <0> | <2> | <1> | <2> | $24_{th}$ gear | |
| <0> | <2> | <2> | <0> | $25_{th}$ gear | |
| <0> | <2> | <2> | <1> | $26^{th}$ gear | |
| <0> | <2> | <2> | <2> | $27^{th}$ gear | |
| <1> | <0> | <0> | <0> | $28^{th}$ gear | |
| <1> | <0> | <0> | <1> | $29^{th}$ gear | |
| | | | etc. | | |
| <1> | <2> | <0> | <0> | $46^{th}$ gear | FIG. 7 |
| | | | etc. | | |
| <2> | <2> | <2> | <1> | $80^{th}$ gear | |
| <2> | <2> | <2> | <2> | $81^{th}$ gear | |

Corresponding to the number m of secondary axes 13 arranged parallel to the primary axis 1, the result is that $(m+1)^{\wedge}n$ gears are possible by different combinations of multiple synchronized, individual reductions or transmissions—without perceptible interruption of the flow of force in n transmission sections 18 with in each case m parallel secondary shafts, i.e., for example with n=3 transmission sections 18 with in each case m=1 parallel secondary shaft 13, $(1+1)^{\wedge}3=8$ gears are possible, with m=2 parallel secondary shafts 13, $(2+1)^{\wedge}3=27$ gears are possible, with m=3 parallel secondary shafts 13, $(3+1)^{\wedge}3=64$ gears are possible, with n=4 transmission sections 18, $(3+1)^{\wedge}4$, i.e. 256 gears are possible, with m=5 transmission sections 18 $4^{\wedge}5$, i.e., 1024 gears are possible, etc. In the present exemplary embodiment with n=4 transmission sections 18 and m=2 parallel secondary shafts 13, thus $(2+1)^4=81$ gears are shiftable.

Figure 8:
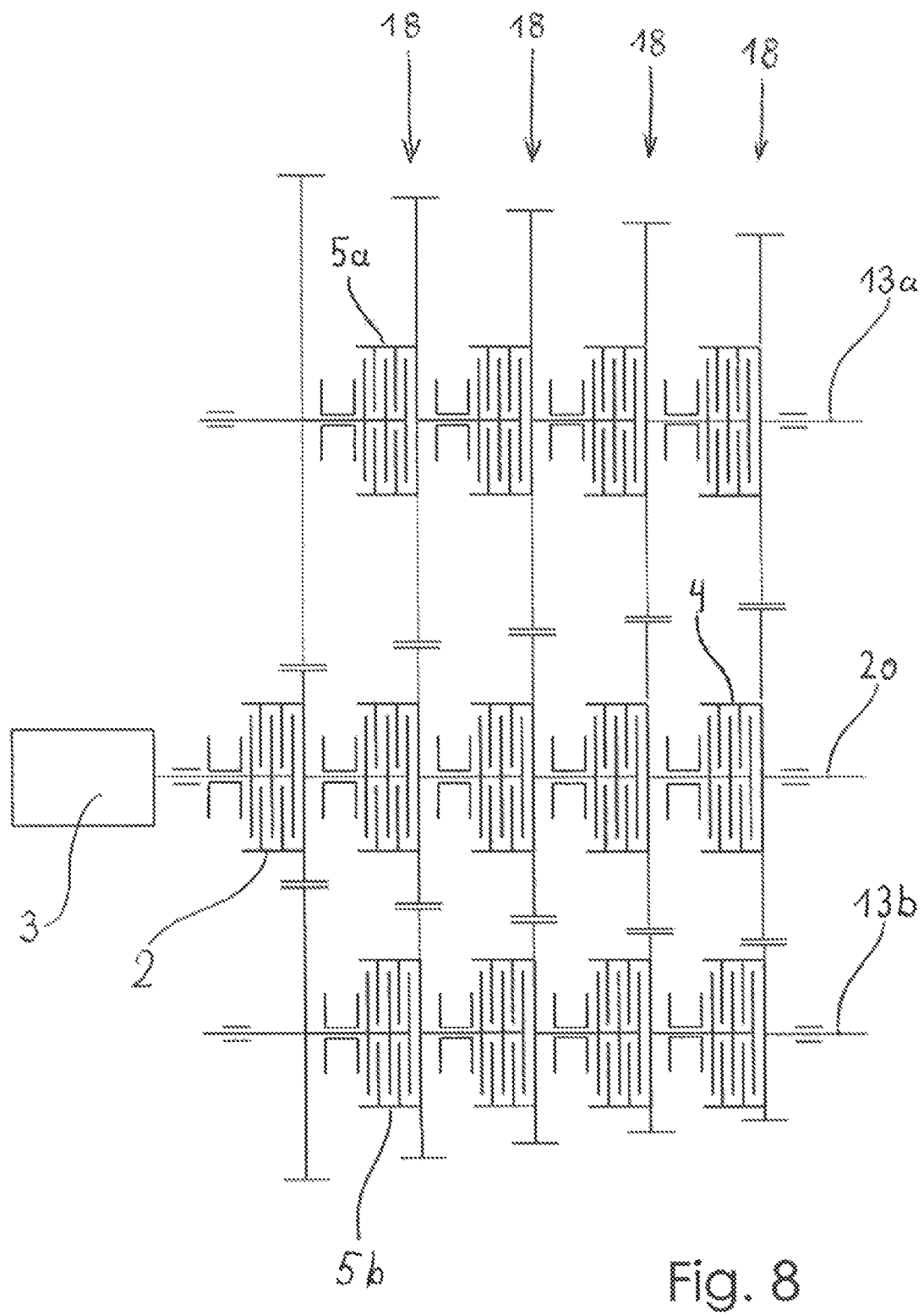
FIG. 8 a schematic illustration of a transmission according to yet another exemplary embodiment.

FIG. 8 shows a possible simplification of the transmissions of the preceding figures.

The transmission of this exemplary embodiment comprises m=2 parallel secondary shafts 13, i.e. m+1-1=3 possible shift positions per transmission section 18 and n=4 transmission sections 18. As described above to FIG. 4, each transmission section 18 can take on three shift positions, namely <0> (primary clutch 4 coupled), <1> (first secondary clutch 5a coupled) or <2> (second secondary clutch 5b coupled). It is to be noted that the technically possible idle position <–> in this exemplary embodiment cannot be counted as defined by this application since the idle position does not correspond to any illustratable number in the number system based on the shift logic. If a coupled state of a clutch is indicated with [+] and a decoupled state with [–], the combinations of clutch states of the clutches 4, 5a, 5b are represented according to table 2 above.

In contrast to the preceding exemplary embodiments, the primary shaft and one or more secondary shafts are characterized in that only the first (or last) wheel of each shaft sits on this shaft as fixed wheel, while all other wheels sit on those shafts as loose gear wheels and can be coupled with the primary and secondary shafts by the primary and secondary clutches in analogy to the preceding descriptions. The number of possible gears results again from the number of primary and secondary shafts as basis and the number of gear wheel levels minus 1 as exponent. Further, this exemplary embodiment is characterized in that the secondary shafts are in different distances to the primary shaft, whereby different transmission ratios are achieved in the individual gear wheel levels.

It is also possible to realize the transmission sections 18 with different numbers of secondary shafts 13. Each transmission section 18 can be seen as a (shiftable) interruption of the primary shaft.

The high number of gears allows developing shift programs for different styles of driving and driving demands.

The present invention was described in detail with reference to preferred exemplary embodiments. It is understood that the description above can only comprise exemplary embodiment options of the present invention and that the invention is not limited to the specific exemplary embodiments described, developments thereof, variants and modifications, but is defined merely by the accompanying claims in each case in the broadest understanding thereof. Modifications, supplementations, replacements and equivalents which are made on the exemplary embodiments described by the person skilled in the art on the basis of his/her knowledge, are to be seen as embodiments of the present invention, insofar they fall within the scope of the accompanying claims.

For example, a counter shaft can be provided before the first transmission section 18 which decreases a torque of the drive unit 3 to realize a reduction in the first gears, for example.

In the exemplary embodiments described above, it was assumed that the gears of each gear set 10, 10a, 10b, 11, 11a, 11b are gear wheels and that each gear set consists of two gear wheels being engaged. Principally, the gear sets can also be composed of other transmission principles, such as friction wheels, chain drive, belt drive etc., and more than two gears can be provided per gear set.

It is also possible that the first gear wheels 6 and the gear wheel(s) 13, 12a, 12b are provided with an inner toothing into which the second gear wheels 14 or third gear wheels 15 engage.

Although not illustrated in detail, a reverse gear can be implemented in a way known per se.

Clutches are also possible that operate as form-fit connections in the form of axially or radially functioning toothings in conjunction with corotational connections to the fixed wheels.

A gear comprises a sequence of shift positions of the individual transmission sections 18 with the transmission described above, wherein this sequence corresponds to the succession of digits of a number of an exponential numerical system, wherein the number of transmission sections 18 corresponds to the number of digits and the number of the different effective (power transmitting) shift positions corresponds to the basis of the numerical system. A first one of the shift positions of a transmission section 18 corresponding to the number <0> is realized via a direct carriage (coupling) of a primary shaft 1 of the transmission section 18 to the primary shaft 1 of the next transmission section 18 or to an output shaft 20 of the transmission. A second one of the shift positions of the transmission section 18 corresponding to the number <1> is either realized by an interruption of the primary shaft coupling and coupling of a secondary shaft 13 (13a) in the flow of force between the primary shaft 1 and the primary shaft 1 of the next transmission section 18 or to an output shaft 20 of the transmission with a predetermined transmission ratio. Thus, in analogy to this system of dual or binary numbers, by different combinations of multiple synchronized, individual reductions or transmissions—without recognizable interruption of the flow of force—with n interruptions of the primary shafts, $2^n$ gears are possible, i.e. for example with 3 secondary shafts $2^3$, i.e. 8 gears are possible, with 5 secondary shafts $2^5$, i.e. 32 gears are possible. Further shift positions of the transmission section 18 corresponding to the number <2>, <3> etc. can be realized by coupling of further secondary shafts (or 13b) instead of the first secondary shaft 13 (13a) in the flow of force between the primary shaft 1 and the primary shaft 1 of the next transmission section 18 or to an output shaft 20 of the transmission at a predetermined transmission ratio.

Thus, a gear results from different combinations of multiple synchronized, individual reductions or transmissions (without recognizable interruption of the flow of force). With n transmission sections 18 (interruptions of the primary shaft 1) with m parallel secondary shafts per transmission section 18, $(m+1)^n$ gears are possible. The table 4 below shows exemplary constellations.

TABLE 4

| Transmission sections (n) | parallel secondary shafts (m) | Calculation rule | Gears |
| --- | --- | --- | --- |
| 3 | 1 | $(1 + 1)^3$ | --> 8 |
| 4 | 1 | $(1 + 1)^4$ | --> 16 |
| 3 | 2 | $(2 + 1)^3$ | --> 27 |
| 4 | 2 | $(2 + 1)^4$ | --> 81 |
| 3 | 3 | $(3 + 1)^3$ | --> 64 |
| 4 | 3 | $(3 + 1)^4$ | --> 256 |
| 5 | 3 | $(3 + 1)^5$ | --> 1024 |

The selection of the gears can be effected by any fix or variable shift programs via mechanical, electric, electronic, pneumatic, magnetic or hydraulic actuators, the control thereof can also be effected mechanically, electrically, electronically, pneumatically, magnetically or hydraulically.

While this invention has been particularly shown and described with references to preferred embodiments thereof, it will be understood by those skilled in the art that various changes in form and details may be made therein without departing from the scope of the invention encompassed by the appended claims.

LIST OF REFERENCE NUMERALS 1 primary shaft
2 input clutch
3 power source
4 primary clutch
5, 5a, 5b secondary clutch
6 first gear wheel
7 cage
8 clutch outer lamellae
9 clutch inner lamellae
10, 10a, 10b first gear set
11, 11a, 11b second gear set
12 fourth gear wheel
13, 13a, 13b secondary shaft
14, 14a, 14b second gear wheel
15, 15a, 15b third gear wheel
16 pressure ring
18 transmission section
19 driven shaft
20 output shaft
A drive side
B driven side
C intermediate position
I, II, III, . . . positions of a transmission section
<0>, <1>, <2>, shift positions of a transmission section
<−> idle position of a transmission section
[+], [−] coupled, decoupled state of a clutch This list of reference numerals is an integral part of the description.

What is claimed is:

1. Transmission having a plurality of transmission sections, wherein each transmission section comprises:
a driven primary shaft;
at least one secondary shaft, which is arranged to rotate independently with respect to the primary shaft; and
a clutch arrangement, which is formed to selectively couple the primary shaft directly with a driven shaft or to couple the secondary shaft or one of the secondary shafts between the primary shaft and the driven shaft, wherein the driven shaft is a primary shaft of a further transmission section or an output shaft of the transmission,
wherein the coupled secondary shaft comprises a predetermined transmission ratio with respect to the primary shaft, wherein when multiple secondary shafts are provided, respective coupled secondary shafts comprise different transmission ratios with respect to the primary shaft;
wherein the primary shaft of each of the transmission sections are arranged coaxially to one another and/or the secondary shaft of each of the transmission sections are arranged coaxially to one another.

2. Transmission according to claim 1,
wherein at least one of the transmission sections comprises at least one secondary shaft of higher order, which is arranged to rotate independently with respect to the secondary shaft or one of the secondary shafts, and the coupling arrangement is formed to selectively couple the secondary shaft directly with the driven shaft or to couple to the secondary shaft of higher order between the secondary shaft and the driven shaft, wherein the coupled secondary shaft of higher order comprises a predetermined transmission ratio with respect to the secondary shaft.

3. Transmission according to claim 1,
wherein the primary shaft and/or the secondary shaft are hollow shafts.

4. Transmission according to claim 1,
wherein an initial position of each transmission section is a shift position, in
which the primary shaft is coupled directly with the driven shaft.

5. Transmission according to claim 1,
wherein at least one of the transmission sections comprises an idle position, in
which none of the primary shaft and the secondary shaft(s) is coupled with the driven shaft.

6. Transmission having a plurality of transmission sections, wherein each transmission section comprises:
a driven primary shaft;
at least one secondary shaft, which is arranged to rotate independently with respect to the primary shaft; and
a clutch arrangement, which is formed to selectively couple the primary shaft directly with a driven shaft or to couple the secondary shaft or one of the secondary shafts between the primary shaft and the driven shaft, wherein the driven shaft is a primary shaft of a further transmission section or an output shaft of the transmission,
wherein the coupled secondary shaft comprises a predetermined transmission ratio with respect to the primary shaft, wherein when multiple secondary shafts are provided, respective coupled secondary shafts comprise different transmission ratios with respect to the primary shaft; and
wherein each transmission section comprises per secondary shaft:
a first gear set, which is arranged between a drive side of the primary shaft and a drive side of the secondary shaft; and
a second gear set, which is arranged between the drive side of the secondary shaft and a drive side of the driven shaft,
wherein one of the first gear set and the second gear set comprises a loose element, and
wherein the clutch arrangement is formed to couple the loose element.

7. Transmission according to claim 6,
wherein among multiple secondary shafts of a transmission section, in each case the first gear set or the second gear set share a transmission element.

8. Transmission according to claim 6,
wherein the first gear set comprises a first gear wheel, which is arranged in the primary shaft, and a second gear wheel, which is arranged on the secondary shaft, as transmission elements; and
the second gear set comprises a third gear wheel, which is arranged on the secondary shaft, and a fourth gear wheel, which is arranged on the driven shaft, as transmission elements;
wherein at least one of the first gear wheel, the second gear wheel, the third gear wheel and the fourth gear wheel is the loose element, wherein the clutch arrangement is formed to couple the first gear wheel with the primary shaft if the first gear wheel is the loose element,
to couple the second gear wheel or the third gear wheel with the secondary shaft if the second gear wheel or the third gear wheel is the loose gear wheel,
to couple the fourth gear wheel with the driven shaft, if the fourth gear wheel is the loose wheel.

9. Transmission according to claim 8,
wherein the clutch arrangement comprises a primary clutch and a secondary clutch,
wherein an input side of the primary clutch is connected to the primary shaft and an output side of the primary clutch is connected to the driven shaft.

10. Transmission according to claim 9, wherein
an input side of the secondary clutch is connected to the primary shaft, wherein the first gear wheel is the loose element, which is loosely arranged in the primary shaft and connected to the output side of the secondary clutch, or
an output side of the secondary clutch is connected to the secondary shaft, wherein the second gear wheel is the loose element, which is loosely arranged on the secondary shaft and connected to the input side of the secondary clutch, or
an input side of the secondary clutch is connected to the secondary shaft, wherein the third gear wheel is the loose element, which is loosely arranged on the secondary shaft and connected to the output side of the secondary shaft, or
an output side of the secondary clutch is connected to the driven shaft, wherein the fourth gear wheel is the loose element, which is loosely arranged on the driven shaft and connected to the input side of the secondary clutch.

11. Transmission according to claim 9,
wherein the primary clutch and the secondary clutch are shifted by a common shift element.

12. Transmission according to claim 1,
wherein a shifting device is formed for shifting gears of the transmission in continuous upward and downward stages of an overall transmission ratio of all transmission sections of the transmission.

13. Transmission according to claim 1,
wherein the transmission is embodied for use on a heat machine, power machine or work machine or a mechanic engine.

14. Transmission according to claim 1,
wherein the primary shafts of all of the transmission sections are arranged coaxially to one another.

15. Transmission according to claim 1,
wherein the at least one secondary shaft rotates axis-parallel with respect to the primary shaft.

16. Transmission according to claim 8,
wherein the first gear set, second gear wheel, third gear wheel, fourth gear wheel comprise pinions.

17. Transmission according to claim 6,
wherein the primary shaft of each of the transmission sections are arranged coaxially to one another and/or the secondary shaft of each of the transmission sections are arranged coaxially to one another.

* * * * *